(12) United States Patent
Jacobsen et al.

(10) Patent No.: US 7,284,471 B2
(45) Date of Patent: *Oct. 23, 2007

(54) PRESSURE CONTROL VALVE HAVING INTRINSIC MECHANICAL FEEDBACK SYSTEM

(75) Inventors: Stephen C. Jacobsen, Salt Lake City, UT (US); Shane Olsen, Centerville, UT (US); Michael Morrison, West Jordan, UT (US)

(73) Assignee: Sarcos Investments LC, Salt lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/293,726

(22) Filed: Dec. 1, 2005

(65) Prior Publication Data
US 2006/0137519 A1    Jun. 29, 2006

Related U.S. Application Data

(60) Provisional application No. 60/632,867, filed on Dec. 2, 2004.

(51) Int. Cl.
*F15B 13/04* (2006.01)

(52) U.S. Cl. .......................................... 91/457; 91/433

(58) Field of Classification Search .................. 91/433, 91/454, 457, 461; 137/596.15, 596.16
See application file for complete search history.

(56) References Cited

U.S. PATENT DOCUMENTS

| | | |
|---|---|---|
| 2,861,550 A | 11/1958 | Hanna et al. |
| 3,566,919 A | 3/1971 | Vanderlaan |
| 3,583,422 A | 6/1971 | Hansjorg et al. |
| 3,593,522 A | 7/1971 | Angert |
| 3,628,554 A | 12/1971 | Wilson |
| 3,732,887 A | 5/1973 | Hayner |
| 3,894,712 A | 7/1975 | Millar et al. |
| 3,927,602 A | 12/1975 | Strauff |
| 3,986,353 A | 10/1976 | Otsubo et al. |
| 4,067,357 A | 1/1978 | Ruchser |
| 4,069,843 A | 1/1978 | Chatterjea |
| 4,131,130 A | 12/1978 | Ruby |
| 4,142,612 A | 3/1979 | Riddel |
| 4,150,543 A | 4/1979 | Helmer et al. |
| 4,203,465 A | 5/1980 | Rissi |
| 4,211,147 A | 7/1980 | Panissidi et al. |
| 4,266,466 A | 5/1981 | Zienms |
| 4,273,030 A | 6/1981 | Beeskow et al. |
| 4,286,432 A * | 9/1981 | Burrows et al. ............... 91/461 |
| 4,348,159 A | 9/1982 | Acheson |

(Continued)

*Primary Examiner*—Thomas E. Lazo
(74) *Attorney, Agent, or Firm*—Thorpe North & Western LLP

(57) ABSTRACT

A method and system for controlling the dynamics of an actuatable load functioning or operable within a servo or servo-type system, wherein the dynamics of the load are controlled by way of a unique pressure control valve configured to provide intrinsic pressure regulation. The pressure control valve comprises dual spools physically independent of one another and freely supported in a valve body to regulate the pressures acting within the overall system between the control or pilot pressure and the load or load pressure. The dual spools of the pressure control valve, although physically independent of one another, function in cooperation with one another in an attempt to maintain a state of equilibrium in the system, namely to keep pressure acting on or within the actuator (the load pressure), or the feedback force corresponding to the load pressure, the same as the control or pilot pressure.

22 Claims, 8 Drawing Sheets

U.S. PATENT DOCUMENTS

| | | | |
|---|---|---|---|
| 4,362,018 A | 12/1982 | Torii | |
| 4,422,293 A | 12/1983 | Ewald | |
| 4,478,250 A | 10/1984 | Lukasczyk et al. | |
| 4,531,369 A * | 7/1985 | Izumi et al. | 60/456 |
| 4,611,621 A | 9/1986 | Miyakawa et al. | |
| 4,657,042 A * | 4/1987 | Lewis | 137/505.13 |
| 4,667,571 A | 5/1987 | Walters | |
| 4,674,539 A | 6/1987 | Sloate | |
| 4,714,459 A | 12/1987 | Hooven | |
| 4,774,976 A | 10/1988 | Janecke et al. | |
| 4,782,859 A | 11/1988 | Constantinian | |
| 4,819,690 A | 4/1989 | Takahashi | |
| 4,923,170 A | 5/1990 | Takaoka et al. | |
| 4,941,508 A | 7/1990 | Hennessy et al. | |
| 5,036,750 A * | 8/1991 | Katayama | 91/464 |
| 5,058,626 A | 10/1991 | Takaoka et al. | |
| 5,103,866 A * | 4/1992 | Foster | 137/596.15 |
| 5,123,450 A | 6/1992 | Wood et al. | |
| 5,363,724 A | 11/1994 | Asahara et al. | |
| 5,385,171 A | 1/1995 | Cleasby | |
| 5,522,301 A | 6/1996 | Roth et al. | |
| 5,538,480 A | 7/1996 | Torimoto | |
| 5,644,967 A | 7/1997 | Joerg et al. | |
| 5,832,882 A | 11/1998 | Matsuda | |
| 5,924,958 A | 7/1999 | Tsuchiya et al. | |
| 5,941,795 A | 8/1999 | Tsuchiya et al. | |
| 6,021,864 A | 2/2000 | Sakata et al. | |
| 6,269,733 B1 | 8/2001 | Reust | |
| 6,463,959 B2 | 10/2002 | Kremer | |
| 6,601,602 B2 | 8/2003 | Adler et al. | |

\* cited by examiner

PRESSURE CONTROL VALVE HAVING INTRINSIC MECHANICAL FEEDBACK SYSTEM

RELATED APPLICATIONS

This application claims priority to U.S. Provisional Patent Application No. 60/632,867, filed Dec. 2, 2004, and entitled, "Pressure Control Valve Having Intrinsic Mechanical Feedback System," which is incorporated by reference in its entirety herein.

FIELD OF THE INVENTION

The present invention relates to servo or servo-type valves configured to control or regulate fluid flow and/or pressure within a servo or other control system, and more particularly to a pressure control valve having an intrinsic mechanical feedback system, wherein the pressure control valve is configured with dual independent spool valves operating to regulate fluid flow, and more importantly pressure, within an open or closed loop system, and particularly between a control or pilot pressure source and a load pressure source, and wherein the feedback system comprises mechanical actuators configured to convert a fluid pressure into a force.

BACKGROUND OF THE INVENTION AND RELATED ART

Control and servo systems, such as hydraulic or pneumatic systems, are well known and operate on the simple principle of transferring force from an applied location to an output location by means of an incompressible fluid. The transfer is typically accomplished by means of a cylinder having a piston contained therein pushing the incompressible fluid through a fluid line to another cylinder, also having a piston, at a different location. One tremendous advantage to transferring force through a hydraulic system is that the incompressible fluid line connecting the two cylinders can be any length and shape, and can wind or bend through all sorts of positions separating the two pistons. The fluid line can also split into multiple other fluid lines thus allowing a master piston to drive multiple slave pistons. Another advantage of hydraulic systems is that it is very easy to increase or decrease the applied force at the output location. This hydraulic force multiplication is accomplished by changing the size of one piston relative to the other.

In most hydraulic systems, cylinders and pistons are connected through valves to a pump supplying high-pressure hydraulic fluid as the incompressible fluid. Spool valves are the most commonly used valves in hydraulic systems and can apply both forward and backward pressure to hydraulic actuators. Usually, in a piston type actuator, drawing the piston back into the cylinder requires very little force and can occur relatively quickly. To accomplish this, the highest possible flow rate of fluid at low pressure is desired and can be realized by moving the spool valve to a position that opens a return fluid line. When pushing the piston, however, the highest possible pressure is necessary in order to generate the maximum force at the output end. Spool valves are ideally suited to hydraulic systems because they allow manipulation of the flow rate to achieve hydraulic force.

Still, in spite of the advantages of spool valves in hydraulic systems, existing spool valves have certain design limitations. Traditional spool valves have been designed to be actuated by either electrical servos or internal control pressures called pilot pressures. Spool valves are commonly mounted in a cylindrical sleeve with fluid ports extending through the sleeve which can be opened or closed for fluid communication with each other by positioning the lands and recesses of the spool in appropriate locations within the sleeve. The working pressure is varied by opening or closing the valve allowing more or less pressurized fluid to flow from the reservoir. Usually, the valve is controlled by an electrical current. The current is related to the pressure in that the greater the current supplied, the wider the valve gate is opened allowing more pressurized fluid to flow. When the load pressure in the actuator finally equals the supply pressure then flow stops. In other words, for a given current you get a prescribed flow and when you get a load pressure that equals the supply pressure then the flow drops off and finally stops. As the load pressure approaches the reservoir pressure the valve loses linear response and the spool valve device system becomes unstable. Consequently, spool valve devices are typically run in the regime where the pressure source (i.e. reservoir) is very high compared to the load pressures and the flow versus input current linear in the usable region. This means that the system, and particularly the load, is always in a pressurized state and cannot be freely moved by an external force or under its own weight.

In addition to the current flow problems of traditional spool valves, classical hydraulic systems are problematic for several other reasons. First, complex controllers are needed to control the cycle times of valves and pistons. Second, cycle times for moving pistons are often long because large amounts of fluid are required to move output pistons. Third, the large quantity of fluid needed to drive output pistons requires constant pressurization of large reservoirs of fluid. Consequently, hydraulic machines typically require large amount of hydraulic fluid for operation and therefore require large external reservoirs to hold the difference in the volume of oil displaced by the two sides of any cylinder.

Classical spool valve devices are also limited in application because when a controlled flow is induced through a valve it is usually only translated into a controlled velocity. Consequently, complex system feedback devices must be used to convert the energy from a velocity system to a position system. Introducing feed back devices into the system limits the response of the system to the bandwidth of the feedback loop and the valves such that the time delays between the feedback devices and the valves make the system unstable when a resistive force is applied.

Still other problems exist with classical servo valves operating in classical servo systems. Due to the problems discussed above, these valves and systems are incapable of performing at high bandwidths without going unstable. In addition, significant amounts of energy may be lost when not all of the valves in a multiple valve system are being used. Finally, these systems exhibit poor impedance properties.

SUMMARY OF THE INVENTION

In light of the problems and deficiencies inherent in the prior art, the present invention seeks to overcome these by providing a servo or servo-type system that utilizes a pressure control valve having an intrinsic mechanical feedback system.

Although several objects of some of the various exemplary embodiments are specifically recited herein, these should not be construed as limiting the scope of the present invention in any way. Indeed, it is contemplated that each of the various exemplary embodiments comprises other objects that are not specifically recited herein, which will be apparent to and appreciated by one of ordinary skill in the art upon practicing the invention as taught and described.

In accordance with the invention as embodied and broadly described herein, what is featured is, generally, a pressure control valve for use within a servo or servo-type system configured to perform one or more active and/or passive functions, such as driving or actuating a load, wherein the pressure control valve comprises dual independent spools and a resultant intrinsic mechanical pressure feedback system. The pressure control valve is designed to regulate the flow of fluid, and more importantly the pressure, within the servo-type system, namely, between the control or pilot pressure and the load or load pressure (e.g., as induced by a hydraulic load actuator coupled to a load, wherein the hydraulic load actuator is configured to convert a load pressure to a force to drive the load, and vice versa in response to external forces acting on the load).

The pressure control valve is unique in that it is capable of operating at high bandwidths without sacrificing stability in the system. The pressure control valve is also unique in that it is capable of allowing the servo-type system to operate with a high degree of efficiency by functioning to allow the free-swing or dangle of the load without requiring power input to move or displace the load to achieve dangle movement. In other words, under certain and selective controlled conditions, the load may free swing or dangle in a bidirectional manner without the need to actively drive the actuator coupled to the load in either direction. In this mode, fluid is allowed to directly shunt back and forth between the actuator, the pressure control valve, and optionally the return reservoir through the return of the pressure control valve.

Instead of requiring a conventional feed back loop, the present invention pressure control valve utilizes a pilot or control pressure that can be set and varied as needed. The control pressure functions to supply pressure to the control chamber in fluid contact with the independent spools. In the event the load pressure or feedback force exceeds the pilot pressure, the return spool opens allowing fluid to flow through the return ports in an attempt to stabilize or equalize the pressure in the system. In the event the pilot pressure or feedback force exceeds the load pressure, the pressure spool opens allowing pressurized fluid to flow through the pressure ports in an attempt to stabilize or equalize the pressure in the system. Thus, the pressure control valve of the present invention could be described generally as a valve having dual independent floating spools that regulate respective pressure and return valves, wherein the spools act in cooperation with one another to keep pressure acting on or within the load actuator (the load pressure) the same as the control or pilot pressure in the pressure control valve. Stated differently, when the load displaces in any one direction, thus changing the pressure in the load actuator, the return and pressure spools adjust to hold the pressure inside the load actuator the same as the control or pilot pressure inside the pressure control valve. Thus, whenever the load pressure or feedback force exceeds the pilot or control pressure, the valve vents to purge pressure, and whenever the load pressure or feedback force is less than the pilot pressure, the valve takes pressurized fluid in and keeps pressure constant just like a regulator. Therefore, the present invention pressure control valve may be thought of as a dynamic pressure regulator. Indeed, the dual independent spools function like dynamically pre-defined fixed pressure regulators because the control or pilot pressure can be changed very quickly and remain stable when load pressures or feedback forces exceed pilot pressures. This allows the gain in the system to be increased significantly without affecting the stability of the system.

Additionally, since the dual independent spool pressure control valve is intrinsically a pressure source instead of a velocity source, when placed in servo or servo-type systems having an actuated load, the pressure in the system is converted to a force that drives the load. Consequently, when the current pressure in the system increases the resultant force within the load also increases.

Specifically, the present invention features a pressure control valve for regulating pressure within a servo system, wherein the pressure control valve comprises: (a) a valve body having return and pressure inlet and outlet ports formed therein, as well as first and second feedback ports, for fluidly communicating with an interior cavity of the valve body; (b) a return spool freely supported within the valve body and configured to regulate fluid flow through the return inlet and outlet ports; (c) a pressure spool, independent of the return spool, and freely supported within the valve body opposite the return spool, wherein the pressure spool is configured to regulate fluid flow through the pressure inlet and outlet ports; (d) an intrinsic mechanical feedback system configured to displace the return and pressure spools in response to a pressure differential created between a pilot pressure and a feedback force concurrently acting on the return and pressure spools, respectively, wherein the intrinsic mechanical feedback system functions to dissipate the pressure differential in an attempt to equalize the pilot pressure and the feedback force; and (e) limiting means located within the valve body configured to establish limiting positions of the return and pressure spools within the valve body during operation.

The present invention further features a pressure control valve comprising: (a) a floating return spool configured to freely move within a valve body; and (b) a floating pressure spool configured to freely move within the valve body, wherein the floating return and pressure spools are structurally independent of one another and the valve body, and wherein the pressure control valve is configured to regulate pressure via an intrinsic mechanical feedback system configured to utilize hydraulic multiplication to intrinsically and systematically displace at least one of the return and pressure spools in response to a pressure differential existing between a pilot pressure and a feedback force acting on opposing sides of each of the return and pressure spools, this in an attempt to dissipate the pressure differential and equalize the pilot pressure and the feedback force.

The present invention further features a method for regulating and controlling pressure within a servo-type system, wherein the method comprises: (a) providing a pressure control valve having a valve body and independent return and pressure spools freely situated in the valve body, wherein the return and pressure spools each comprise a pilot pressure side and a feedback side and each are configured to regulate fluid flow through return and pressure inlet and outlet ports formed in the valve body, respectively, in accordance with an intrinsic mechanical feedback system; (b) supplying a pilot pressure to the respective pilot pressure sides of the return and pressure spools; (c) supplying a feedback force to the respective feedback sides of the return and pressure spools, wherein the feedback force corresponds to a load pressure that is converted by first and second mechanical feedback actuators positioned adjacent the return and pressure spools, respectively; and (d) inducing a pressure differential across the pilot pressure and feedback sides of the return and pressure spools, thus causing at least one of the return and pressure spools to displace in response to the pressure differential in an attempt to dissipate the pressure differential and equalize the pilot pressure and the feedback pressure.

The method further comprises providing a hydraulic load actuator to generate the load pressure, wherein the hydraulic load actuator comprises a pre-determined size and cross-sectional area.

The method further comprises utilizing the mechanical feedback actuators, each having a pre-determined size and cross-sectional area different from the hydraulic load actuator, to achieve a pre-determined degree of hydraulic multiplication for accommodating a pre-determined load/displacement ratio.

BRIEF DESCRIPTION OF THE DRAWINGS

The present invention will become more fully apparent from the following description and appended claims, taken in conjunction with the accompanying drawings. Understanding that these drawings merely depict exemplary embodiments of the present invention they are, therefore, not to be considered limiting of its scope. It will be readily appreciated that the components of the present invention, as generally described and illustrated in the figures herein, could be arranged and designed in a wide variety of different configurations. Nonetheless, the invention will be described and explained with additional specificity and detail through the use of the accompanying drawings in which:

FIG. 6-B illustrates a cut-away view of another exemplary limiting means in the form of a single nub protruding from the interior wall portion of the valve body;

FIG. 6-C illustrates a cut-away view of another exemplary limiting means in the form an annular ring protruding from the interior wall portion of the valve body;

DETAILED DESCRIPTION OF EXEMPLARY EMBODIMENTS

Figure 1:
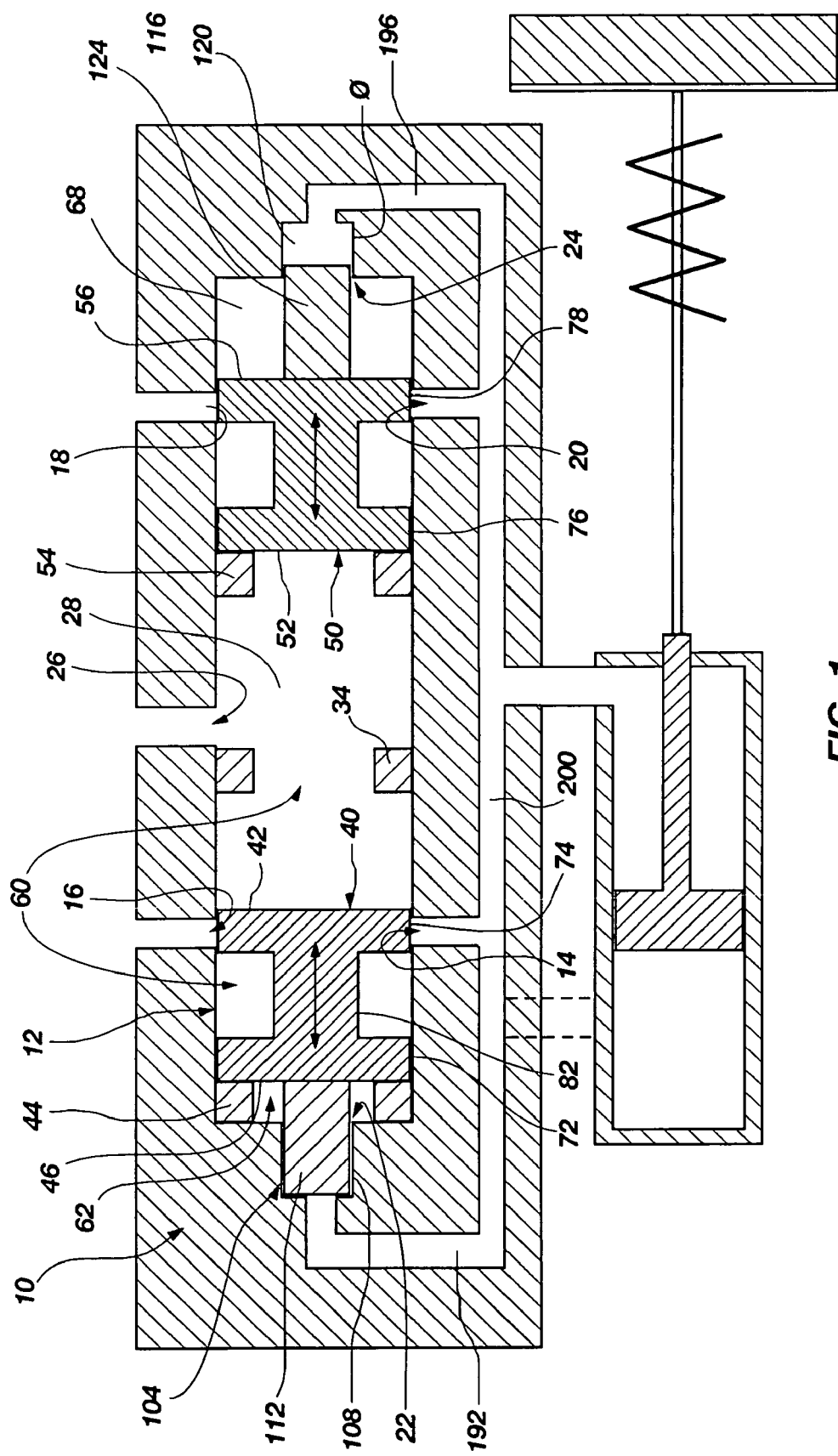
FIG. 1 illustrates a cut-away, cross-sectional view of one exemplary embodiment of a dual independent spool pressure control valve, wherein the pressure control valve is in a state of equilibrium, and wherein the intrinsic mechanical feedback system is shown comprising actuators of a pre-determined size.

The following detailed description of exemplary embodiments of the invention makes reference to the accompanying drawings, which form a part hereof and in which are shown, by way of illustration, exemplary embodiments in which the invention may be practiced. While these exemplary embodiments are described in sufficient detail to enable those skilled in the art practice the invention, it should be understood that other embodiments may be realized and that various changes to the invention may be made without departing from the spirit and scope of the present invention. Thus, the following more detailed description of the embodiments of the present invention, as represented in FIGS. 1 through 8, is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

The following detailed description and exemplary embodiments of the invention will be best understood by reference to the accompanying drawings, wherein the elements and features of the invention are designated by numerals throughout.

The present invention describes, generally, a method and system for controlling the dynamics of an actuatable load functioning or operable within a servo or servo-type system, wherein the dynamics of the load are controlled by way of unique pressure control valve (hereinafter "PCV") configured to provide intrinsic pressure regulation. Unlike conventional flow control valves, the present invention PCV provides better dynamic performance by being able to provide sufficiently high gain, and therefore achieve soft or better performance, without going unstable. Indeed, the present invention PCV provides force control rather than velocity control, such as in conventional flow control valves.

The PCV, which may be referred to as a dynamic pressure regulator because of its capabilities, is unique in that it utilizes dual spools that are physically independent of one another and freely supported in the valve body to regulate the pressures acting within the overall system between the control or pilot pressure and the load or load pressure. The dual spools of the PCV, although physically independent of one another, function in cooperation with one another in an attempt to maintain a state of equilibrium in the system, namely to keep pressure acting on or within the actuator (the load pressure) the same as the control or pilot pressure. Moreover, pressure regulation and control is intrinsic to the PCV because of the configuration and function of the dual spools and the intrinsic mechanical feedback system, thus eliminating the need for electronically or mechanically user controlled feedback systems.

The PCV actuates, and therefore regulates pressure, via an intrinsic mechanical feedback system that functions in response to a pressure differential existing between the load pressure (or feedback force) and the pilot pressure, wherein the pressure differential may be generated by any one of or both of a change in load pressure or pilot pressure. Two independent spools, namely a pressure spool and a return spool, freely situated or disposed within the PCV function to regulate fluid flow, and therefore pressure, through respective pressure and return ports, thereby systematically controlling the pressurized fluid input into the system, as well as the fluid returning from the system to the fluid reservoir. Actuation of the PCV effectively means intrinsic actuation of at least one or both of the spools in response to the pressure differential. As a result of the configuration of the PCV, the dual independent spools intrinsically and systematically respond to the pressure differential between the internal pilot pressure and/or the load pressure by displacing to either regulate fluid flow, and more specifically pressure, through the pressure ports or the return ports or both. Specifically, when the load pressure exceeds the pilot pressure, the return spool displaces to open the return port, thus relieving pressure within the system, in attempt to dissipate the pressure differential and to restore a state of equilibrium between the pilot pressure and the feedback force. Conversely, when the pilot pressure exceeds the load pressure, the pressure spool displaces to open the pressure port, thus increasing pressure within the system, also in an attempt to dissipate the pressure differential and to equalize the pilot pressure and the feedback pressure. In another aspect, the return and pressure ports may be partially open and/or closed at the same time in order to regulate pressure within the system and to achieve a predetermined system pressure state.

When the pilot pressure forces the pressure spool to open the pressure port, thus allowing pressurized fluid into the system, the PCV transmits the resulting pressure to the actuator, which converts the pressure into a force to drive the load. When an external force is applied to the load, thus increasing the load pressure within the system, the actuator converts this force into a pressure, wherein the increased pressure causes the return spool of the PCV to displace to open the return port to purge or dissipate pressure from the system in an attempt to maintain a state of equilibrium between the pilot pressure and the load pressure. Moreover, the PCV is configured to provide the ability for the load to freely move or swing (referred to herein as dangle) under its own weight or in response to an external force. This is accomplished by selectively lowering and maintaining the pilot pressure below the feedback pressure so that the return spool displaces to open the return port, thus reducing pressure losses in the system and allowing fluid to slosh or shunt back and forth between the actuator and the pressure control valve, and/or optionally the return fluid reservoir. Each of the above aspects are discussed in greater detail below.

In some embodiments, and under certain system parameters, the PCV operates without significantly using or diluting the primary fluid reserve that has been pressurized. This is achieved by providing separate and independent pressure and return spools for controlling the pressurized fluid and the fluid returning to the reservoir, respectively. Separate, independent spools also allow area ratio hydraulic multiplication to take place at the valve rather than at the actuator, thus requiring only minimal amounts of pressurized fluid in order to increase or decrease the force output of the hydraulic system. This creates a servo or servo-type system that is primarily concerned with conserving fluid consumption and preserving the main pressure source rather than requiring large amounts of fluid as do prior related systems. If the ratios are changed at the valve, then delicate motions by the actuator will not use the entire fluid supply but will instead use a fraction of the fluid used in conventional servo systems. In other words, under certain system parameters the dual independent spool valves are capable of allowing fluid to flow through the return of one or more actuators and one or more pressure control valves independent of, and/or without significantly disturbing, the main pressure source. Each of the above aspects are discussed in greater detail below.

Definitions

The phrase "pressure differential," and similar phraseology, as used herein, shall be understood to mean or shall refer to a state of non-equilibrium existing within the system between the pilot pressure and the load pressure. In some embodiments, a "pressure differential" may mean a simple difference in pressure magnitudes between the load pressure and the pilot pressure. In other embodiments, namely those utilizing area reduction for load/force translation or multiplication, a "pressure differential" may mean a non-proportional difference in pressure existing between the load pressure and the pilot pressure, taking into account the different areas of the valve body, the actuator, and any mechanical feedback cylinders.

The phrase "load pressure," as used herein, shall be understood to mean the pressure existing within the load actuator coupled to a load. The load pressure directly influences and dictates the feedback force.

The phrase "feedback force," as used herein, shall be understood to mean the force acting upon the feedback sides of the return and pressure spools as received or dictated by the load pressure and converted by the mechanical feedback actuators after all area reductions/increases and fluid pressure multiplications/divisions have occurred, if any. The feedback force may, in some cases, equal the load pressure.

The phrase "load actuator," as used herein, shall be understood to mean any system or device capable of converting fluid energy into usable energy, such as mechanical energy. A typical example of a load actuator is a hydraulic actuator coupled to a load, wherein the hydraulic actuator receives pressurized hydraulic fluid from a hydraulic fluid source and converts this into mechanical work or a force sufficient to drive a load.

The term "dangle," as used herein, shall be understood to mean the free swing of the load in either direction in response to an external force, wherein the movement of the load is achieved without providing active input to move the load in either direction (which condition may be referred to as passive passivity). The ability to dangle or free-swing is made possible by the present invention pressure control valve operating in the "slosh mode." The term "slosh" or the phrase "slosh mode," as used herein, shall be understood to mean the state of the pressure control valve, wherein the pilot pressure is maintained below the load pressure or feedback force, thus causing the return spool to displace to the open position. The pilot pressure may fluctuate in order to keep it below any fluctuating load pressures or feedback forces (e.g., due to the relative position of a piston within an actuator coupled to a load). With the pilot pressure below the load pressure or feedback force and the return spool open, fluid is able to shunt or slosh back and forth between the load actuator and the return fluid reservoir through the open return ports of the pressure control valve in response to movement of the load imposed by external forces (e.g., under gravity, as a result of an externally applied force to the load, etc.) or internal forces (e.g., such as a result of momentum, etc.). The shunting of fluid is done with little or no resistance, thus improving the impedance of the system.

In the slosh mode, no active input (e.g., power) is required to influence the dynamics of the load in either direction as in prior related servo systems. Indeed, prior related systems are apparently passive, meaning that some degree of power is still needed to move the load in one or both directions. This prior art condition may be termed as "active passivity" because, although the system appears passive, it really is active.

On the other hand, the present invention pressure control valve is capable of passive passivity. Passive passivity may be termed as the ability of the present invention pressure control valve, as contained within a servo or servo-type system, to allow the load to move in response to the imposed external or internal conditions without any active input or influence (power) from the system.

Intrinsically Regulated Pressure Control Valve

With reference to FIG. 1, illustrated is a cut-away view, as taken along a longitudinal cross-section, of one exemplary embodiment of a dual independent spool pressure control valve. Specifically, FIG. 1 illustrates a dual independent spool pressure control valve (PCV) 10 configured for regulating pressure within a closed-loop system, such as a hydraulic system. In the exemplary embodiment shown, the PCV 10 comprises a valve body 12 comprising an in-line linear structure having formed therein a return inlet port 14, a return outlet port 16, a pressure inlet port 18, a pressure outlet port 20, first and second feedback ports 22 and 24, and a pilot pressure port 26. The PCV 10 further comprises dual independent spools, namely return spool 40 and pressure spool 50, commonly situated about a longitudinal axis of the valve body 12. Return and pressure spools 40 and 50 are freely disposed and supported within valve body 12 and restricted in movement by one or more limiting means, such as spool stops 34, 44 and 54. Finally, the PCV 10 comprises, as part of its intrinsic feedback system, a mechanical pressure feedback system shown as feedback actuators 104 and 116.

As shown, this particular embodiment of the valve body 12 comprises a cylindrical, tube shaped structure having an interior cavity 60 defined therein by the wall segment of the valve body 12. The interior cavity 60 is configured to contain or house each of the pressure and return spools 40 and 50, as well as to accommodate their displacement. Indeed, the interior cavity 60 comprises a diameter or cross-sectional area that is slightly larger than the diameter or cross-sectional area of the return and pressure spools 40 and 50, thus allowing the return and pressure spools 40 and 50 to move bi-directionally therein, as well as to adequately seal against the inside surface of the wall segment of the valve body 12 as needed. The size of the interior cavity 60 with respect to the return and pressure spools 40 and 50 is such that the return and pressure spools 40 and 50 are able to maintain their orientation within the interior cavity 60 as they are caused displace back and forth therein.

The interior cavity 60, and the return and pressure spools 40 and 50, are also sized to achieve a sealed relationship. In essence, the valve body 12, and particularly the interior cavity 60, has defined therein various chambers. As shown in FIG. 1, valve body 12 comprises a pilot pressure chamber 28 defined by the distance or area between the return and pressure spools 40 and 50, a return spool feedback chamber 62 defined by the area between the return spool 40 and an end of the valve body 12, and a pressure spool feedback chamber 68 defined by the area between the pressure spool 50 and an opposing end of the valve body 12. Each one of these chambers varies in size depending upon the realized displacement of one or both of the return and pressure spools 40 and 50 during actuation of the PCV. Each of chambers 62 and 68 are sealed from pilot pressure chamber 28 by the interaction of return and pressure spools 40 and 50 with the inside surface of the wall of the valve body 12. Providing a sealed relationship between the return and pressure spools 40 and 50 with the valve body 12 functions to maintain the integrity of the system by eliminating unwanted fluid crosstalk and pressure leaks. The return and pressure spools 40 and 50 may comprise a sealed relationship to the valve body 12 using any known means in the art. Whatever type of sealing arrangement used however, the return and pressure spools 40 and 50 are to be configured to displace in response to the pressure differentials acting within the system in an attempt to dissipate the pressure differential.

The PCV 10, and particularly the valve body 12, further comprises several ports that function to facilitate fluid flow through the PCV 10 and that communicate with the interior cavity 60. In the embodiment shown, the valve body 12 has formed therein several inlet and outlet ports that are regulated by the positioning of the return and pressure spools 40 and 50. Specifically, the valve body 12 comprises a return inlet port 14 and a return outlet port 16, wherein the return spool 40 is caused to displace to open these ports to allow fluid to flow therethrough and pressure to be purged from the PCV 10, and the system in which it is operating, in those conditions when the load pressure exceeds the pilot pressure. The valve body 12 also comprises a pressure inlet port 18 and a pressure outlet port 20, wherein the pressure spool 50 is caused to displace to open these ports to allow fluid to flow therethrough and pressure to be input into the PCV 10, and the system in which it is operating, in those conditions when the pilot pressure exceeds the load pressure.

The return inlet and outlet ports 14 and 16, respectively, and the pressure inlet and outlet ports 18 and 20, respectively, along the valve body 12 and with respect to the return and pressure spools 40 and 50 are preferably related, such that when the return inlet and outlet ports 14 and 16 are open, the pressure inlet and outlet ports 18 and 20 are closed, and vice versa. Thus, the PCV 10, and more particularly the return and pressure spools 40 and 50 and the return and pressure inlet and outlet ports 14, 16, 18, and 20, are configured to allow the PCV to function as intended, depending upon the pressures acting within the system. One skilled in the art will recognize other design alternative configurations, other than the specific ones illustrated and described herein.

In the embodiment shown in FIG. 1, the return inlet and outlet ports 14 and 16 are shown closed by the return spool 40 as positioned within the valve body 12. Pressure inlet and outlet ports 18 and 20 are also shown closed by the pressure spool 50 as positioned within the valve body 12. This condition or operating configuration represents equivalent output or load pressures (and feedback pressures) and pilot pressures, wherein the system is balanced and in a state of equilibrium. In other words, the PCV 10 is static as no pressure differential exists within the system to displace either of the return or pressure spools 40 and 50. Indeed, pressure is neither being input into the system nor being purged from the system through the return or pressure inlet and outlet ports 14, 16, 18, and 20 as the system is balanced between the pilot pressure and the feedback force (or load pressure).

The return inlet port 14 fluidly communicates with the interior cavity 60 in the valve body 12 and a load actuator, such as a hydraulic actuator (not shown). In contrast, the return outlet port 16 fluidly communicates with the interior cavity 60 in the valve body 12 and a return fluid reservoir (also not shown). The fluid communication between these various return ports is controlled by return spool 40, as is discussed in greater detail below. It will be appreciated, however, that when the load pressure (and/or feedback) pressure exceeds the control pressure, the return spool 40 displaces to open the return inlet and outlet ports 14 and 16, thus allowing fluid to flow through the return inlet port 14, into interior cavity 60, and subsequently through the return outlet port 16 toward the return fluid reservoir to purge pressure from the system. In other words, if the pilot pressure is lowered below the output or load pressure, the feedback pressure will be higher than the pilot pressure, thus causing the return spool to displace to open the return inlet and outlet ports 14 and 16. Fluid flows from the output port to the return ports 14 and 16, thus causing the load and feedback pressures to drop. With the return ports open, the output pressure falls until it is equal to the pilot port pressure. The return spool then closes, preventing the output pressure from falling below the pilot port pressure.

One of the unique aspects of the present invention is that the control or pilot pressure in the system may be dropped and maintained at a level sufficient to open the return spool 40 and the return inlet and outlet ports 14 and 16. In this mode, the PCV 10 functions to allow fluid to slosh or shunt back and forth between the load actuator (hydraulic actuator) and the return fluid reservoir through the return inlet and outlet ports 14 and 16 according to the movement of the load. This effectively allows the load to free swing or dangle without requiring any active input to drive the load in either direction. The concept of dangling when the PCV 10 is in the slosh mode is discussed in greater detail below.

The pressure inlet port 18 fluidly communicates with the interior cavity 60 of the valve body 12 and a pressurized fluid source (not shown). In contrast, the pressure outlet port 20 fluidly communicates with the interior cavity 60 in the valve body 12 and the load actuator. The fluid communication between these various ports is controlled by the pressure spool 50, as is discussed in greater detail below. It will be appreciated, however, that when the pilot pressure exceeds the load pressure (or feedback force) pressure, the pressure spool 50 displaces to open the pressure inlet and outlet ports 18 and 20, thus allowing pressurized fluid to flow through the pressure inlet port 18, into interior cavity 60, and subsequently through the pressure outlet port 20 to supply pressure to the load actuator, which converts the increased pressure into a force that actively drives the load. In other words, as the pilot pressure is raised to exceed the feedback pressure, this causes the pressure spool 50 to displace to open the pressure inlet and outlet ports 18 and 20. Fluid flows from the pressure supply and pressure ports to the output/load pressure port, thus causing the output and feedback pressures to rise. With the pressure supply open, the output pressure rises until it is equal to the pilot port pressure. The pressure spool 50 then closes preventing the output pressure from rising above the pilot port pressure.

The valve body 12 further has formed therein a pilot pressure port 26 that functions to facilitate the flow of pressurized fluid into the pilot pressure chamber 28. The pilot pressure port 26 fluidly communicates with a pilot valve (not shown) configured to supply pressurized fluid from a fluid source, such as a pump, to the pilot pressure chamber 28. The pressurized fluid (thus, the pilot or control pressure) input into the pilot pressure chamber 28 through the pilot pressure port 26 functions to act upon a pilot pressure side 42 of return spool 40 and a pilot pressure side 52 of pressure spool 50 to influence the displacement of the return and pressure spools 40 and 50 away from each other. In addition, the pilot pressure input into the pilot pressure chamber 28 functions to oppose or counteract the load pressure or feedback force that is also acting on the return and pressure spools 40 and 50 through the mechanical feedback system. As such, the pilot pressure functions as a control pressure for the PCV 10 and the system. Indeed, the pilot pressure may be selectively increased or decreased or held constant relative to the load pressure to control the displacement of the return and pressure spools 40 and 50, and therefore the pressure within the system. Varying or changing the pilot pressure may be done very rapidly, which allows the PCV to act like a dynamically pre-defined fixed pressure regulator.

It will be appreciated that the size of the pilot pressure chamber 28 can vary with the magnitude of the pilot pressure and the resultant displacement position of the return and pressure spools 40 and 50 within the valve body as opposed by the load pressure acting through the feedback system. Thus, the pilot pressure chamber 28 is a function of the relationship between the pilot pressure and the load pressure or feedback force. It will also be appreciated that a pilot pressure chamber 28 will always exist in the PCV 10 as the return and pressure spools 40 and 50 are prohibited from making contact with each other no matter the magnitude of the load pressure. Indeed, the return and pressure spools 40 and 50 are limited in the distance they are allowed to displace as a result of the ends of the valve body 12, as well as various limiting means strategically placed within the interior cavity 60 of the valve body.

The limiting means are intended to control the displacement distance each of the return and pressure spools 40 and 50 are allowed to travel within the valve body 12. More specifically, the limiting means function to establish a predetermined operating position for each of the spools during the various operating states or modes of the PCV 10. One exemplary form of limiting means is a plurality of spool stops strategically positioned within the interior cavity 60 of the valve body 12 to prevent unwanted displacement of the spools within the valve body 12. FIG. 1 illustrates these as spool stops 34, 44, and 54. Return and pressure spools 40 and 50 are unable to come into contact with one another due to spools stops 34 and 54, wherein spool stop 34 restricts the movement of the return spool 40 so that it can never close the pilot port 26, and spool stop 54 similarly restricts the movement of the pressure spool 50. Thus, the pilot pressure chamber 28 is always present and accessible to receive fluid from the pilot pressure source through the pilot pressure port 26.

First feedback port 22, formed in a first end of the valve body 12, facilitates the communication of the mechanical feedback actuator 104 with the return spool feedback chamber 62 and the feedback side 46 of return spool 40 that functions as one boundary for the feedback chamber 62. First feedback port 22 communicates with first feedback line 192 via mechanical feedback actuator 104. First feedback line 192 facilitates the fluid communication of the load actuator (not shown), which may comprise a load cylinder such as a hydraulic actuator, with the mechanical feedback actuator 104. Thus, fluid from the load actuator can flow through the first feedback line 196, into the first mechanical feedback actuator 104, and particularly the cylinder 108, thus driving a feedback piston 112 through the feedback port 22 and into the feedback chamber 62, thereby communicating a feedback force to the feedback side 46 of the return spool 40. The first mechanical feedback actuator 104 comprises a pre-determined diameter or cross-sectional area, which functions to convert the load pressure received by the load actuator into a feedback force to be exerted on the return spool 40. This conversion is based upon common principles of hydraulic multiplication which is well known in the art.

It will be appreciated that when the feedback force acting upon the feedback side 46 of the return spool 40 is greater than the pilot pressure in the pilot pressure chamber 28 acting on the pilot side 42 of the return spool 40, the return spool 40 will displace towards the center of the pilot pressure chamber 28, thus opening the return inlet and outlet ports 14 and 16 to purge pressure from the system. Incidentally, spool stop 34 may be present to prohibit the return spool 40 from displacing too far to close the pilot port 28. The return spool 40 stays in this opened position until the load pressure or feedback force and the pilot pressure equalize. Conversely, when the feedback force acting on the feedback side 46 of the return spool 40 is less than the pilot pressure in the pilot pressure chamber 28 acting on the pilot side 42 of the return spool 40, the return spool 40 will displace towards the end of the valve body 12 away from the pilot pressure chamber 28 until it contacts the spool stop 44. In this position, the return inlet and outlet ports 14 and 16 are closed allowing the system pressure to increase. The return spool 40 maintains this position until the feedback force again exceeds the pilot pressure in the pilot pressure chamber 28.

Similarly, second feedback port 24, formed in a second end of the valve body 12, facilitates the communication of the mechanical feedback actuator 116 with the pressure spool feedback chamber 68 and the feedback side 56 of the pressure spool 50 that functions as one boundary for the feedback chamber 68. Second feedback port 24 communicates with second feedback line 196 via a mechanical feedback actuator 116. The second feedback line 196 facilitates the fluid communication of the load actuator (not shown), which may comprise a load cylinder such as a hydraulic actuator, with the mechanical feedback actuator 116. Thus, fluid from the load actuator can flow through the second feedback line 196, into the second mechanical feedback actuator 116, and particularly the cylinder 120, thus driving the feedback piston 124 through the feedback port 24 and into the feedback chamber 68, thereby communicating a feedback force to the feedback side 56 of the pressure spool 50. The second mechanical feedback actuator 116 comprises a pre-determined diameter or cross-sectional area, which functions to convert the load pressure received by the load actuator into a feedback force to be exerted on the pressure spool 50. This conversion is based upon common principles of hydraulic multiplication which is well known in the art.

It will be appreciated that when the feedback force acting upon the feedback side 56 of the pressure spool 50 is less than the pilot pressure in the pilot pressure chamber 28 acting on the pilot side 52 of the pressure spool 50, the pressure spool 50 will displace towards the second end of the valve body 12, compressing the feedback piston 124, and thus opening the pressure inlet and outlet ports 18 and 20 to increase the system pressure by supplying pressurized fluid to the system. Spool stop 54 functions to limit the distance the pressure spool 50 is allowed to displace in response to an exerted feedback force. The pressure spool 50 stays in this opened position until the load pressure or feedback force and the pilot pressure equalize. Conversely, when the feedback force acting on the feedback side 56 of the pressure spool 50 is greater than the pilot pressure in the pilot pressure chamber 28 acting on the pilot side 52 of the pressure spool 50, the feedback piston 124 will drive the pressure spool 50 to displace towards the pilot chamber 28 until it contacts the spool stop 54. In this position, the pressure inlet and outlet ports 18 and 20 are closed allowing the system pressure to be purged if needed. The pressure spool 50 maintains this position until the pilot pressure in the pilot pressure chamber 28 again exceeds the feedback force.

Limiting means, namely, spool stops 34, 44 and 54, respectively, are configured to limit the movement of return and pressure spools 40 and 50 within the interior cavity 60 of the valve body 12. More specifically, the limiting means are configured to ensure the proper displacement and alignment of the return and pressure spools 40 and 50 with respect to the return and pressure inlet and outlet ports 14, 16, 18, and 20, as well as the pilot pressure port 26. As noted above, spool stop 34 restricts the movement of return and pressure spools 40 and 50 towards each other. Specifically, spool stop 34 is positioned such that return spool 40 cannot close pilot pressure port 26. Spool stop 34 also prevents fluid communication between the return inlet and outlet ports 14 and 16 and the feedback chamber 62 and the mechanical feedback actuator 104.

Spool stop 44 restricts the displacement of the return spool 40 towards the end of the valve body 12, as shown. Specifically, spool stop 44 is positioned such that the return inlet and outlet ports 14 and 16 are closed when the return spool 40 contacts the spool stop 44. It will also be appreciated that the position of spool stop 44 also prevents fluid communication between the return inlet and outlet ports 14 and 16 and the pilot pressure chamber 28.

Spool stop 54 restricts the movement of the pressure spool 50 towards the return spool 40 and the pilot chamber 28. Specifically, spool stop 54 is positioned such that the pressure inlet and outlet ports 18 and 20 are closed when the pressure spool 50 contacts the spool stop 54. It will also be appreciated that spool stop 54 prevents fluid communication of the pressure inlet and outlet ports 18 and 20 with the feedback chamber 68 and the mechanical feedback actuator 116. Moreover, pressure inlet and outlet ports 18 and 20 are not allowed to be in fluid communication with the pilot pressure chamber 28.

As stated, the PCV 10 further comprises dual, independent spools, namely return spool 40 and pressure spool 50, that are preferably freely situated or supported within the interior cavity 60 of the valve body 12. By freely supported it is meant that the spools are not attached to each other or any other structure or device, such as mechanical actuating or supporting means. In other words, the spools float within the interior of the valve body and are constrained in their movement or displacement only by the pressures acting upon them and any limiting means located in the valve body 12. In one aspect, the return and pressure spools 40 and 50 are low mass spools. However, the mass of the spools may vary depending upon the application.

Return and pressure spools 40 and 50 are intended to operate within the valve body 12 independent of one another. The term "independent" or the phrase "independently controlled and operated" or any other similar terminology or phraseology, as used herein, is intended to mean that the two spools are operated or controlled individually or separately and that they are free from interconnection with or interdependence upon one another. This also means that the return and pressure spools 40 and 50 displace or are caused to displace in response to the intrinsic pressure/force parameters acting within the system at any given time and not by any mechanically or electrically controlled actuation device or system. More specifically, the PCV is intended to regulate pressure within the system it is contained in accordance with the pressure feedback system intrinsic to the PCV, wherein the return and pressure spools are caused to displace in accordance with a pressure differential occurring or acting within the system in an attempt to dissipate the pressure differential. A pressure differential exists when the load pressure or feedback force acting on one side of the return and pressure spools differs from the pilot pressure concurrently acting on the other side of the return and pressure spools. As these two pressures concurrently acting on opposite sides of the return and pressure spools differ, and depending upon the dominant pressure or force, the return and pressure spools will displace to open and close the appropriate ports that would facilitate or cut off the fluid flow needed to balance the overall system pressure or that would attempt to balance the load pressure in the load cylinder and the pilot pressure.

In the PCV 10, a pressure differential is created when the feedback force acting on the feedback sides 46 and 56 of the return and pressure spools 40 and 50, respectively, comprises a different magnitude than the pilot pressure acting on the pilot pressure sides 42 and 52, respectively, of the return and pressure spools 40 and 50. This pressure differential may be in favor of the feedback force (due to the load pressure) or the pilot pressure. Either way, the return and pressure spools 40 and 50 are designed to displace in response to the pressure differential in an attempt to dissipate the pressure differential and to restore a state of equilibrium between the pilot pressure and the feedback force (or load pressure). However, the pilot pressure, since it is specifically and selectively controlled, will be capable of inducing a pre-determined pressure differential for a pre-determined duration of time. Thus, if the pressure in the system needs to be increased, the pilot pressure is selectively manipulated to exceed the feedback force, thus causing the pressure spool 50 to displace to open pressure inlet and outlet ports 18 and 20 and to let pressurized fluid from the pressure source into the system. Likewise, if the pressure in the system needs to be reduced, the pilot pressure can be selectively manipulated to be less than the feedback force, thus causing the return spool 40 to displace to open return inlet and outlet ports 14 and 16 and to purge pressure from the system. It should be noted that a pressure differential may be induced in the system by manipulation of the pilot pressure or the load. Either way, the resulting displacement of spools functions to open and close the appropriate inlet and outlet ports to regulate the pressure within the system.

Both the return and pressure spools 40 and 50 comprise a geometric configuration or shape that matches or substantially matches or conforms to the geometric configuration or shape of the interior cavity 60 of the valve body 12. As shown, return and pressure spools 40 and 50 are generally cylindrical in shape, and comprise two lands and a recess therebetween, as well as first and second sides. Specifically, in the embodiment shown in FIG. 1, return spool 40 comprises a pilot pressure side 42, a feedback side 46, a first land 72, a second land 74, and a recess 82 extending between lands 72 and 74. Pressure spool 50 comprises a similar geometric configuration or design in that it also comprises a pilot pressure side 52, a feedback side 56, a first land 76, a second land 78, and a recess 84 extending between lands 76 and 78.

As noted above, feedback side 46 of return spool 40 is in fluid communication with feedback chamber 62 and receives the feedback piston 112, while the pilot pressure side 42 is in fluid communication with the pilot pressure chamber 28. Lands 72 and 74 comprise a suitable diameter or cross-sectional area so as to be able to seal against the interior wall surface of the valve body 12. As sealed, and during displacement of the return spool 40, lands 72 and 74 prevent fluid communication or fluid crosstalk between feedback chamber 62, recess 82, and pilot pressure chamber 28. In addition, lands 72 and 74 function with recess 82, since it is smaller in diameter than lands 72 and 74, to facilitate the proper flow of fluid through return inlet port 14 to outlet port 16. Indeed, once these ports are opened, the fluid flows into the PCV 10 through the return inlet port 14, through the recess 82 of the return spool 40, and out the return outlet port 16.

Also as noted above, the feedback side 56 of the pressure spool 50 is in fluid communication with the feedback chamber 68 and functions to receive the feedback piston 124, while the pilot pressure side 52 of the pressure spool 50 is in fluid communication with the pilot pressure chamber 28. Lands 76 and 78 also comprise a suitable diameter or cross-sectional area so as to be able to seal against the interior wall surface of the valve body 12. As sealed, and during displacement of the pressure spool 40, lands 76 and 78 prevent fluid communication or fluid crosstalk between feedback chamber 68, recess 84, and pilot pressure chamber 28. In addition, lands 76 and 78 function with recess 84, since it is smaller in diameter than lands 76 and 78, to facilitate the proper flow of fluid through pressure inlet port 18 to pressure outlet port 20. Indeed, once these ports are opened, fluid flows into the PCV 10 through the pressure inlet port 18, through the recess 84 of the pressure spool 50, and out the pressure outlet port 20.

In accordance with the immediate discussion, one of the unique features of the present invention PCV is its intrinsic mechanical feedback system. Unlike prior related systems that focus on and function to control fluid flow, this intrinsic mechanical feedback system functions to allow the PCV to control the pressures within a servo or servo-type system automatically, in response to induced conditions, or in a manipulative manner, this without requiring user or other external control means. The intrinsic mechanical feedback system is a function of the communication between the various components of the PCV and the pilot and load pressures. More particularly, the intrinsic mechanical feedback system is a function of the communication between the pilot and load pressures acting on opposing sides of the independent return and pressure spools, wherein the load and pilot pressures oppose one another. The independent return and pressure spools, which may be considered floating spools within the valve body, are configured to act in concert with one another to systematically displace, in accordance with an induced pressure differential, to open the appropriate ports to either increase or decrease overall system pressure. Owing to the various limiting means strategically placed within the system, as well as the relative positioning of the return and pressure inlet and outlet ports, the independent return and pressure spools are configured to displace accordingly to restore the servo system to as close a state of equilibrium as possible, limited only by system constraints and/or selective and controlled operating conditions. Various examples of the present invention PCV intrinsic mechanical feedback system are illustrated in the figures and described below with respect to the various operating states of the PCV.

Return and pressure spools 40 and 50 will be located in specific positions depending on the pilot pressure, as well as whether it is desired that a pressure within the load actuator be increased, whether the load actuator is to be allowed to relax, or whether the load actuator will be required to hold a sustained load. Various operating conditions or modes of the PCV 10 with the spools shown in both actuated and resting positions are discussed below.

FIG. 1 illustrates as part of its intrinsic mechanical feedback system first and second feedback actuators 104 and 116. These actuators each comprise a fluid cylinder 108 and 120 configured to house an actuatable feedback piston 112 and 124, respectively, that displace back and forth in response to the load exerted on each of its sides.

One end of the cylinders 108 and 120 is in fluid communication with first and second feedback ports 22 and 24, respectively, while the other end facilitates the displacement of the pistons 112 and 124 to be in communication or contact with the return and pressure spools 40 and 50, respectively. First and second feedback ports 22 and 24 are in communication with first and second feedback lines 192 and 196, through the mechanical feedback actuators 104 and 116, respectively, wherein the first and second feedback lines 192 and 196 are configured to receive fluid from or transmit fluid to main line 200. Main fluid line 200 fluidly connects to the load actuator (not shown) through a load feed line.

Each of the mechanical feedback actuators 104 and 116 function to convert fluid pressure to force, and force to fluid pressure. Therefore, in the event of a high load pressure and a low pilot pressure, fluid flows through the main line 200 into feedback lines 192 and 196 and into cylinders 108 and 120. As fluid enters cylinders 108 and 120, it causes the pistons 112 and 124 to displace, which displacement converts the pressure into kinetic energy comprising a force that acts upon the return and pressure spools 40 and 50, thus causing the spools to displace (which displacement is, of course, limited by the limiting means). During the conversion of the load pressure to a feedback force, some degree of hydraulic multiplication may be experienced due to the predetermined size of the mechanical feedback actuators 104 and 116 as compared to the load actuator. Similarly, in the event of a low load pressure and a high pilot pressure, the return and pressure spools 40 and 50 exert a feedback force on the first and second mechanical feedback actuators 104 and 116. This force is converted into a fluid pressure through the displacement of the feedback pistons 112 and 124, which fluid pressure overcomes the load or feedback pressure acting on the spools. Again, some degree of hydraulic multiplication may be implemented. Essentially, the mechanical feedback actuators 104 and 116 function to provide feedback to the return and pressure spools in accordance with the pressure differential acting thereon. This mechanical actuator configuration, along with their interaction with the return and pressure spools 40 and 50, provides the PCV 10 with a unique and intrinsic feedback system.

While FIG. 1 illustrates one exemplary embodiment of a PCV, it will be appreciated that other embodiments are contemplated herein. Indeed, the PCV shown in FIG. 1 may be modified to comprise return and pressure spools 40 and 50 of different configurations or sizes. Naturally, however, the valve body 12 would have to comprise corresponding different diameters to accommodate the different sized spools. Therefore, in other embodiments, it is contemplated that the valve body 12, and the independent spools disposed therein, may comprise uniform or non-uniform diameters, as well as different geometric cross-sectional shapes other than circular. Additionally, ports 14, 16, 18, 20, 22, 24 and 26 in valve body 12 can vary in size, and various size and shape combinations are anticipated in order to obtain particular pressure-force-area relationships necessary for a specific or given application.

Figure 2:
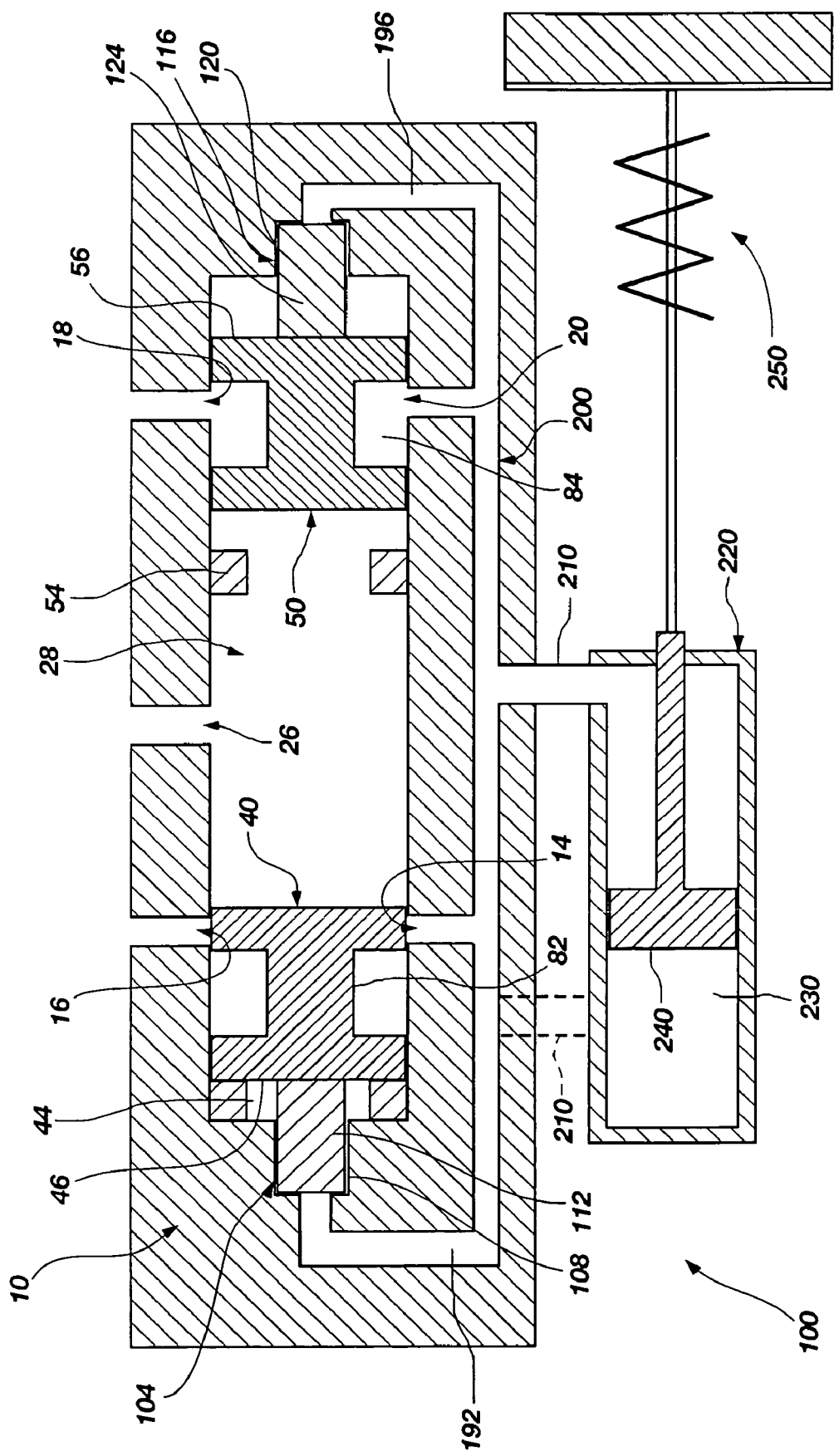
FIG. 2 illustrates a cut-away, cross-sectional view of the exemplary dual independent spool pressure control valve shown in FIG. 1, wherein the valve is in an actuated state to allow pressurized fluid to enter in to a servo-type system as the pilot pressure exceeds the feedback force.

With reference to FIG. 2, illustrated is a cut-away view, taken along a longitudinal cross-section, of the exemplary dual independent spool pressure control valve (PCV) discussed above, and illustrated in FIG. 1, wherein the PCV 10 is operably contained within a servo or servo-type system, and particularly a hydraulic actuator system 100. Specifically, FIG. 2 illustrates PCV 10 in an actuated state with the pressure inlet and outlet ports 18 and 20 open. In this scenario, the servo system comprises a pilot pressure that exceeds the load or feedback force exerted by the mechanical feedback pistons 112 and 124 and acting upon the feedback sides of return and pressure spools 40 and 50, which feedback force is converted from the load pressure acting on the first and second mechanical feedback actuators 104 and 116 as induced by the actuator 220 and actuator piston 240. To achieve this state, the elevated pilot pressure existing within the pilot pressure chamber 28 acts upon the pilot pressure sides 42 and 52 of the return and pressure spools 40 and 50. Because of spool stop 44, the return spool 40 is prohibited from displacing, thus return inlet and outlet ports 14 and 16 remain shut. Conversely, the pilot pressure causes the pressure spool 50 to displace as the pilot pressure acting on the pilot pressure side 52 of the pressure spool 50 overcomes the feedback force acting upon the feedback side 56 of the pressure spool 50 as induced by the mechanical feedback actuator 116. As the feedback and/or load pressure is overcome, the feedback piston 124 compresses to allow the pressure spool 50 to displace away from the spool stop 54, thus being positioned to open the pressure inlet and outlet ports 18 and 20. This allows pressurized fluid from a pressure source (not shown) to flow through the pressure inlet port 18, through the recess 84 of the pressure spool 50, out of the pressure outlet port 20, and into the hydraulic actuator 220 via a main fluid line 200. In essence, the system pressure is increased by the added pressurized fluid, thus evidencing the ability of the PCV to restore the system 100 to a state of equilibrium where the pilot pressure is equivalent to the feedback force. The pressure source may be configured to supply fluid at any pressure, but will typically be sufficient to drive the actuator piston 240, and subsequently the load 250, in accordance with desired operating conditions.

As mentioned, the return spool 40 is simultaneously being acted upon by the pilot pressure, which results in its continued contact with the spool stop 44, in which the return spool 40 is positioned to close the return inlet and outlet ports 14 and 16, respectively, thus preventing the flow of fluid out of the system 100. It will be appreciated that the pressure spool 50 is caused to displace as a result of the pilot pressure exceeding the feedback force exerted by the mechanical feedback actuator 116, thus, creating a pressure differential in the system 100. It will also be appreciated that the pressure spool 50 is capable of responding to the pressure differential without external controlling means, thus illustrating the intrinsic feedback capabilities of the present invention PCV.

Additionally, FIG. 2 illustrates first and second feedback lines 192 and 196, which are in fluid communication with main fluid line 200 and mechanical feedback actuators 104 and 116. Also in fluid communication with main fluid line 200 are pressure and return inlet and outlet ports 14, 16, 18, and 20. Load actuator 220 is also in fluid communication with the main fluid line 200 by way of a load feed line 210, which allows fluid to flow in and out of the actuator 220 (e.g., allows pressurized fluid to flow into the actuator 220 to displace the piston 240 and drive the load 250). The load feed line 210 is configured and functions as an output or load pressure port for the pressure control valve. The main fluid line 200 and the load feed line 210 function as the means of fluidly connecting the PCV 10 to the actuator 220 to allow the PCV 10 to function as intended.

As indicated, the pressure control valve comprises an output/load pressure port. In the embodiment shown, the main fluid line 200 is also in fluid communication with a load feed line 210 (or output/load pressure port), which allows fluid to flow between the main fluid line 200 and load actuator 220. In FIG. 2, load actuator 220 is a hydraulic actuator having a bottom loaded piston, meaning the load feed line 210 couples to the piston cylinder 230 below the piston 240. Increasing the pressure in the hydraulic system, thus increasing the pressure in the portion of the actuator cylinder 230 below the piston 240, causes the piston 240 to move away from the load feed line 210, thus exerting a force on the load 250, represented in FIG. 2 as an inline resistor.

Consequently, load actuator 220 can exert a variable feedback force on the load feedback sides 46 and 56 of return and pressure spools 40 and 50 through main feed line 200, first and second feedback lines 192 and 196, and mechanical feedback actuators 104 and 116. That is, when hydraulic actuator 220 comprises a load that translates into a feedback force that is less then the pilot pressure, a pressure differential is created. This pressure differential causes the pressure spool 50 to displace accordingly to open pressure inlet and outlet ports 18 and 20 in an attempt to dissipate the pressure differential and to equalize the system once again. Opening these ports causes pressurized fluid to enter the system, thus causing piston 240 to exert an associated force on attached load 250. Alternatively, when load actuator 220 comprises a load that translates into a feedback force that is greater than the pilot pressure, a pressure differential of a different kind is created. This pressure differential causes the return spool 40 to displace accordingly to open return inlet and outlet ports 14 and 16 in an attempt to purge pressure and equalize the pilot pressure and feedback force. Opening these ports purges pressurized fluid from the system, thus lowering the overall system pressure and allowing the load to retract. As can be seen, the intrinsic feedback system allows the present invention PCV 10 to function with significant advantages over prior related systems.

Figure 3:
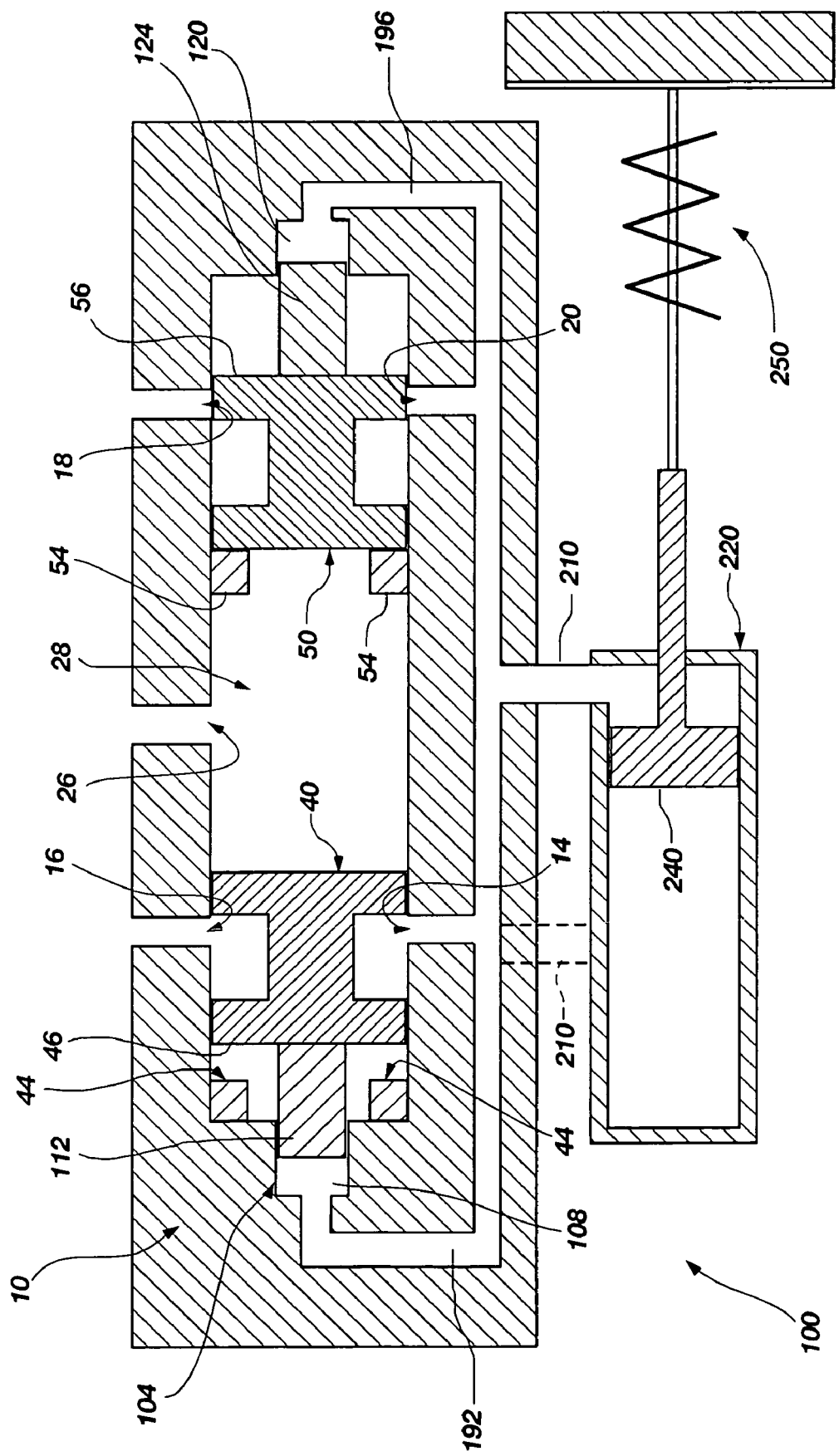
FIG. 3 illustrates a cut-away, cross-sectional view of the exemplary dual independent spool pressure control valve shown in FIG. 1, wherein the valve is in an actuated state to purge pressure from the servo-type system as the feedback force exceeds the pilot pressure.

With reference to FIG. 3, illustrated is a cut-away view, also taken along a longitudinal cross-section, of the exemplary dual independent spool pressure control valve (PCV) discussed above, and illustrated in FIG. 1, wherein the PCV is operably contained within a hydraulic actuator system 100. Specifically, FIG. 3 illustrates PCV 10 in a pressure relieving state, wherein the load pressure or resulting feedback force exceeds the pilot pressure in the pilot pressure chamber 28. In this state, the load feedback side 46 of the return spool 40 is being acted upon by the feedback piston 112 that exerts a feedback force capable of displacing the return spool 40 away from the spool stop 44, thus allowing the return inlet and outlet ports 14 and 16 to open. This allows return fluid to flow through the return inlet port 14, through recess 82 of return spool 40, out return outlet port 16, and back into the return fluid reservoir (not shown). At the same time, the load feedback side 56 of the pressure spool 50 is also being acted upon by the feedback piston 124 that exerts a feedback force capable of forcing the pressure spool 50 against the spool stop 54, thus closing the pressure inlet and outlet ports 18 and 20, and thus preventing flow of pressurized fluid through the hydraulic system 100.

It will be appreciated that the return spool 40 is caused to displace by the influence of the feedback force due to the pressure differential existing between the pilot pressure and the load pressure or resulting feedback force. Indeed, as the feedback force exceeds the pilot pressure a pressure differential exists between the pilot pressure side 42 and the load feedback side 46 of the floating return spool 40. A similar pressure differential acts on floating pressure spool 50. Therefore, when the load pressure or resulting feedback force is greater than the pilot pressure, and the return spool 40 is displaced to open the return inlet and outlet ports 14 and 16, the pressure spool 50 is also forced against the spool stop 54, thereby closing the pressure inlet and outlet ports 18 and 20. Opening the return inlet and outlet ports 14 and 16 functions to allow fluid to flow out of the actuator 220 and the PCV 10, thereby reliving pressure within the system 100.

By dropping the pilot pressure below the load pressure or feedback force, thus causing the return inlet and outlet ports 14 and 16 to open, another unique aspect of the PCV 10 is realized. In this state, known as the slosh mode, the return fluid is able to shunt or slosh back and forth between the PCV 10 and the actuator 220, through the return of the PCV 10, and optionally the fluid reservoir in response to the movement of the load 250, and subsequently the actuator piston 240, as it is being acted upon by an external force. In the slosh mode, the load is allowed to move without any active driving input from the system. In other words, with the PCV 10 in the slosh mode, the load is capable of swinging freely or dangling without requiring active input to move the load in either direction, as is required in prior related systems. For example, with the pilot pressure reduced and the return spool 40 displaced to open the return inlet and outlet ports 14 and 16, the load is capable of moving under external influences, such as in response to gravity.

Another aspect of dangling made possible by the PCV placed in the slosh mode is the ability of the load to move in response to momentum induced within the load as it is being actively driven. For example, the load may be driven in short bursts by the quick and periodic input of pressurized fluid. Depending upon the mass of the load and the degree of active input into the actuator 220 (e.g., pressurized fluid) to drive the load, there may be a degree of momentum induced within the load once the supply of pressurized fluid is cut off. Unlike prior related systems where this momentum would be wasted, the present invention PCV is able to enter the slosh mode, which allows the load to utilize the induced momentum to displace an additional distance unaided by any active input. Once the momentum is exhausted and the load stops moving, the pilot pressure may be increased to deactivate the slosh mode (e.g., close the return inlet and outlet ports). The load may again be driven by raising the pilot pressure to exceed that of the load or feedback force, thus causing the pressure spool to displace to open the pressure inlet and outlet ports to again supply pressurized fluid to the system capable of driving the load.

The ability of the load to dangle or free swing as the PCV is in the slosh mode is advantageous in that significant energy savings are realized because the load can act under gravity or its own momentum to move, thus reducing the amount of power required to manipulate the load as desired. The slosh mode and its advantages will be especially significant to the field of robotics as various robotic systems can be made to mimic human movement much more closely and with less required power input.

The terms "slosh" or the phrase "slosh mode," as used herein, shall be understood to mean or shall refer to the condition or state of the present invention PCV in which the pilot pressure is always less than the load or feedback force acting on the return and pressure spools, no matter the position of the load actuator piston or load pressure within the actuator, so as to actuate the return spool to open the return inlet and outlet ports, thus allowing fluid to shunt or slosh back and forth through the PCV, and particularly these opened ports, between the load actuator (or some other similar device upstream from the return inlet port) and a fluid reservoir or line downstream from the return outlet port. An example of this state is illustrated in FIG. 3.

Figure 4:
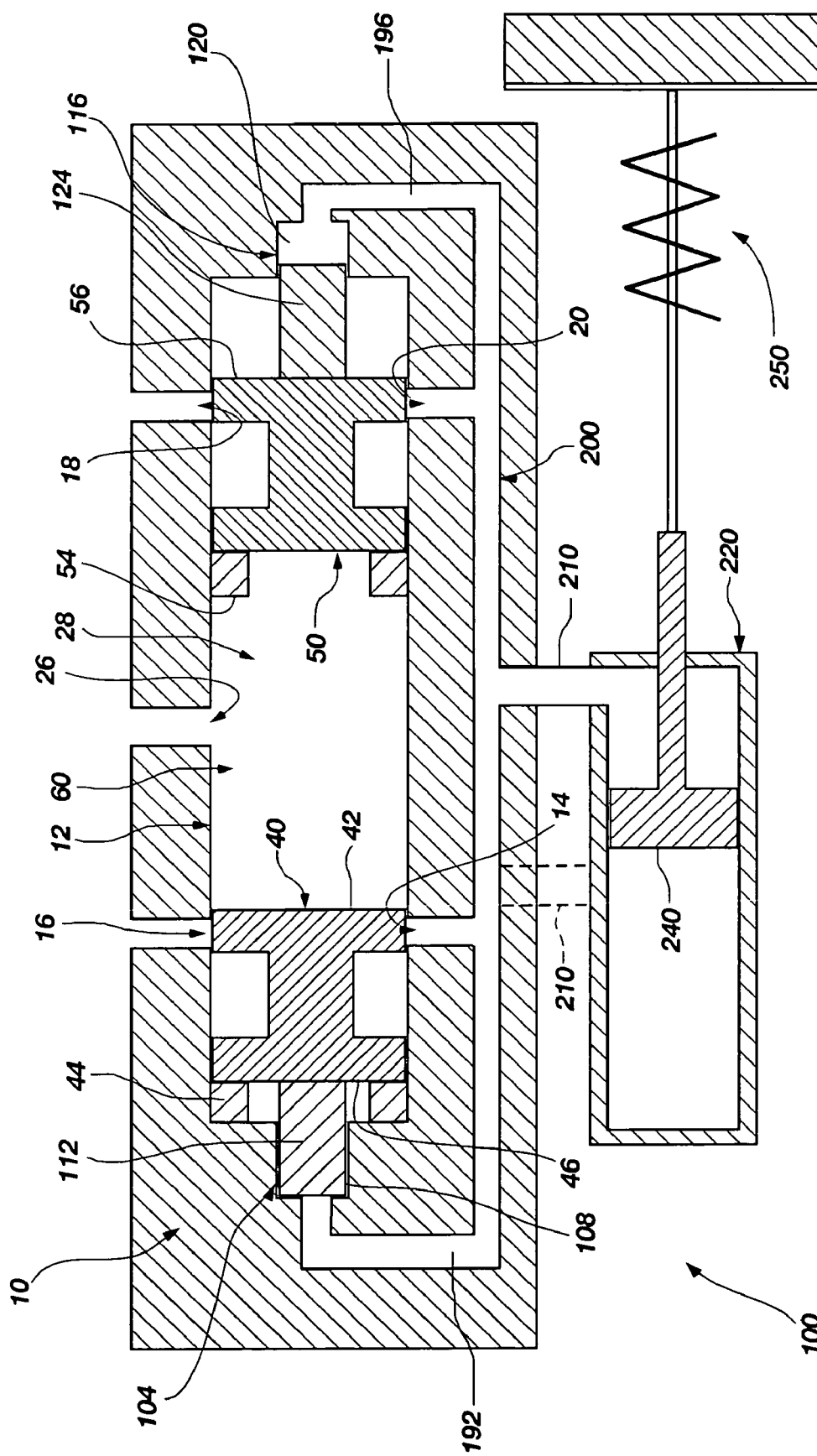
FIG. 4 illustrates a cut-away, cross-sectional view of the exemplary dual independent spool pressure control valve shown in FIG. 1, wherein the valve is in a non-actuated state where the pilot pressure equals or is substantially equal to the feedback force.

With reference to FIG. 4, illustrated is a cut-away view, also taken along a longitudinal cross-section, of the exemplary PCV discussed above, and illustrated in FIG. 1, wherein the PCV is again operably contained within a hydraulic actuator system 100. Specifically, FIG. 4 illustrates PCV 10 in a non-actuated state, wherein the feedback force exerted by the mechanical feedback actuators 104 and 116 on the feedback sides 46 and 56 of the return and pressure spools 40 and 50, respectively, is equal to the pilot pressure in the pilot chamber 28 acting on the pilot sides 42 and 52 of the return and pressure spools 40 and 50, respectively. In this state, the return spool 40 is caused to rest against spool stop 44, thereby closing return inlet and outlet ports 14 and 16 and preventing fluid from returning from hydraulic actuator 220 and pressure escaping the system 100. Additionally, pressure spool 50 is displaced to rest against spool stop 54, thereby closing the pressure inlet and outlet ports 18 and 20 and preventing pressurized fluid from a fluid source (not shown) from flowing into the system 100, and particularly hydraulic actuator 220. In this configuration, the hydraulic actuator 220 and the coupled load 250 are static. The load 250 will be able to move only when a pressure differential is created across the return and pressure floating spools 40 and 50. A pressure differential may be created by either increasing or decreasing the pilot pressure in the pilot pressure chamber 28, or by increasing or decreasing the load pressure acting within the hydraulic actuator 220.

Figure 5:
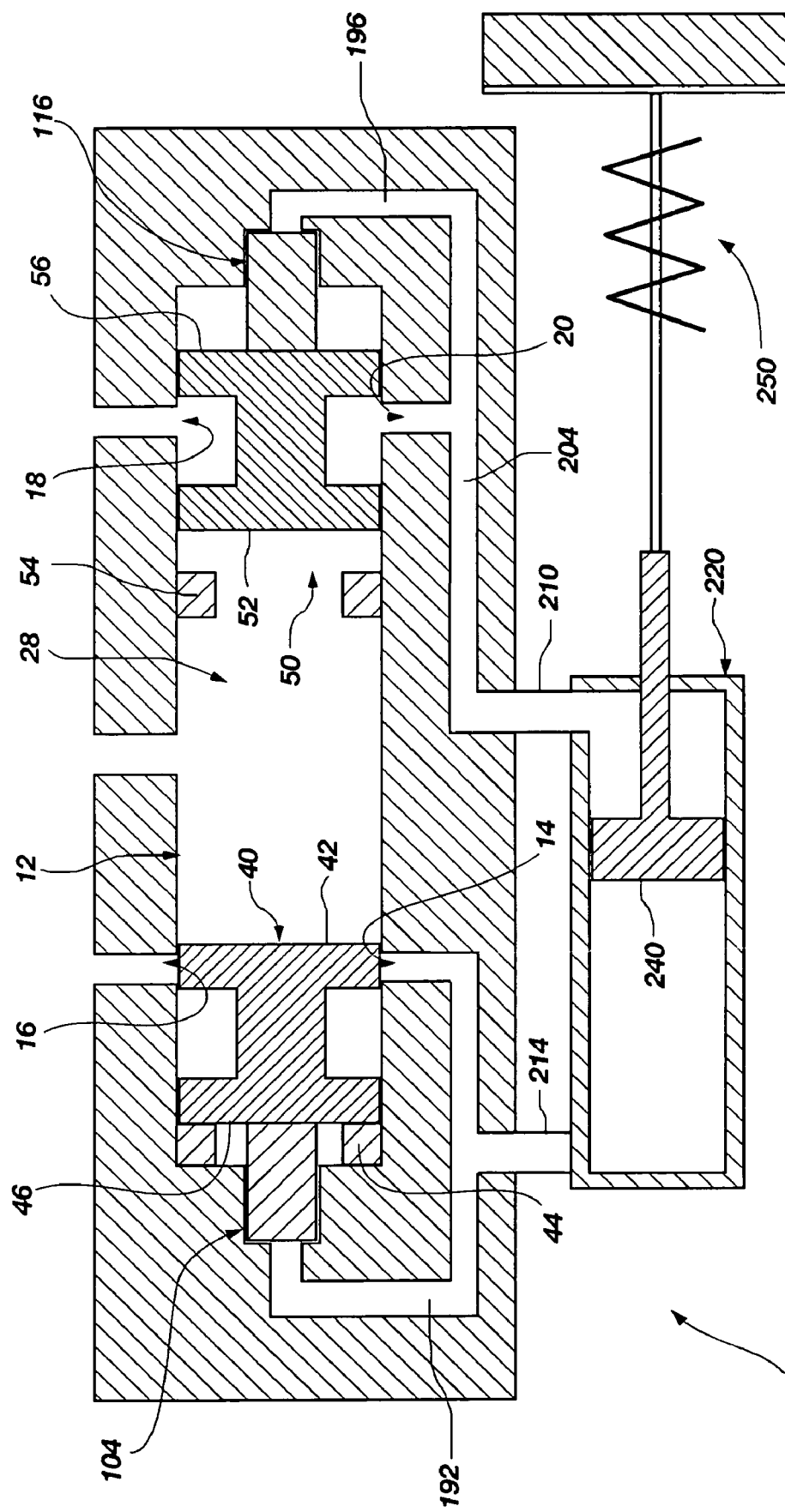
FIG. 5 illustrates a cut-away, cross-sectional view of another exemplary dual independent spool pressure control valve, wherein the pressure feedback is disconnected from the return pressure feedback.

Referring now to FIG. 5, shown is another exemplary embodiment of a hydraulic actuator system 100 having a PCV 10 supported therein. In this embodiment, the PCV 10 comprises a main pressure line 204 that is fluidly connected, at one end, to a portion of an actuator 220 on one side of an actuator piston 240 through pressure load line 210 (or output/load pressure port), and, at another end, to the pressure inlet and outlet ports 18 and 20. Main pressure line 204 is also fluidly connected to first feedback line 192, which is fluidly connected to the mechanical feedback actuator 104, and particularly to the cylinder 108. The PCV 10 further comprises a main return line 208 that is fluidly connected, at one end, to a portion of the actuator 220 on an opposite side of the actuator piston 240 through return load line 214, and, at its other end, to the return inlet and outlet ports 14 and 16. The main return line 208 is also fluidly connected to a second feedback line 196, which is fluidly connected to the mechanical feedback actuator 116, and particularly to the cylinder 120.

In operation, the PVC 10 functions similar to the embodiments discussed above and illustrated in FIGS. 1-4. However, in this embodiment the PCV 10 fluidly disconnects the return and pressure sides. Thus, in the event that the pilot pressure in pilot pressure chamber 28 exceeds the load pressure or feedback force acting on the feedback sides 46 and 56 of return and pressure spools 40 and 50, pressure spool 50 displaces to open pressure inlet and outlet ports 18 and 20. This allows pressurized fluid from a pressure source (not shown) to enter the system 100 and travel through the main pressure line 204 and the pressure load line 210 into actuator 220 to drive the actuator piston 240, and subsequently the load 250 coupled thereto. On the other hand, fluid and pressure are purged from the system 100 from the opposite side of the piston 240 through the return inlet and outlet ports 14 and 16 once the pilot pressure is decreased to be below the load or feedback force. With the pilot pressure below the load or feedback force, the return spool 40 is caused to displace to purge pressurized fluid from the system 100. The pressure from the pressure source input into the system can also be selectively controlled with respect to the pilot pressure to allow the PCV 10 to function properly.

Figure 6A:
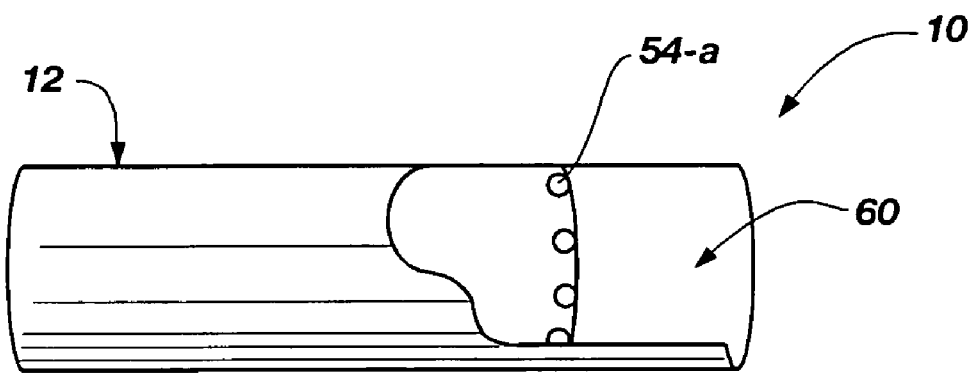
FIG. 6-A illustrates a cut-away view of one exemplary limiting means in the form of a series of nubs annularly spaced around and protruding from the interior wall portion of the valve body.
Figure 6B:
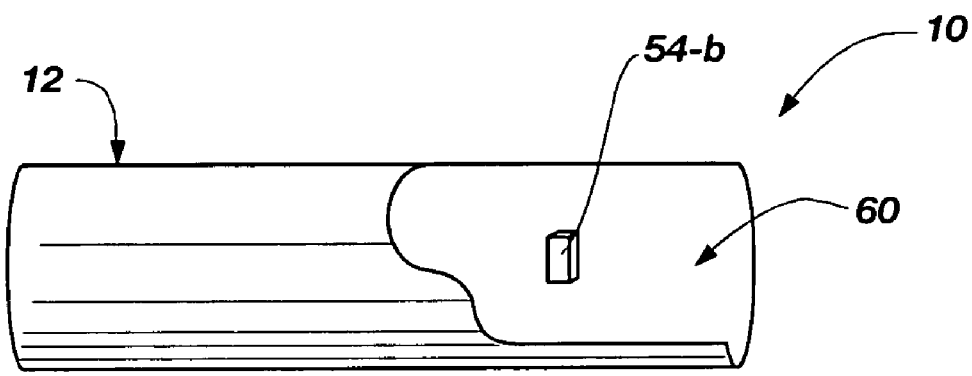
Figure 6C:
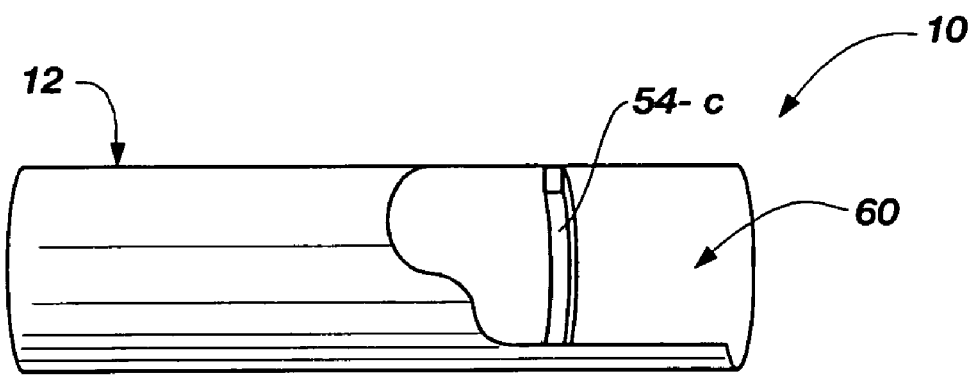

FIGS. 6-a-6-c illustrate several examples of different types of limiting means that can be utilized within the PVC 10. FIG. 6-a illustrates a plurality of spool stops in the form of beads 54-a protruding from and annularly spaced around the inside wall surface of the interior cavity 60 of the valve body 12. FIG. 6-b illustrates at least one spool stop in the form of a nub 54-c protruding from and positioned at a proper location on the inside surface of the interior cavity 60 of the valve body 12. FIG. 6-c illustrates a spool stop in the form of a solid ring protruding from and annularly extending around the inside wall surface of the interior cavity 60 of the valve body 12. One skilled in the art will recognize other types of limiting means that can be used to control the displacement of the return and pressure spools described herein.

Figure 7:
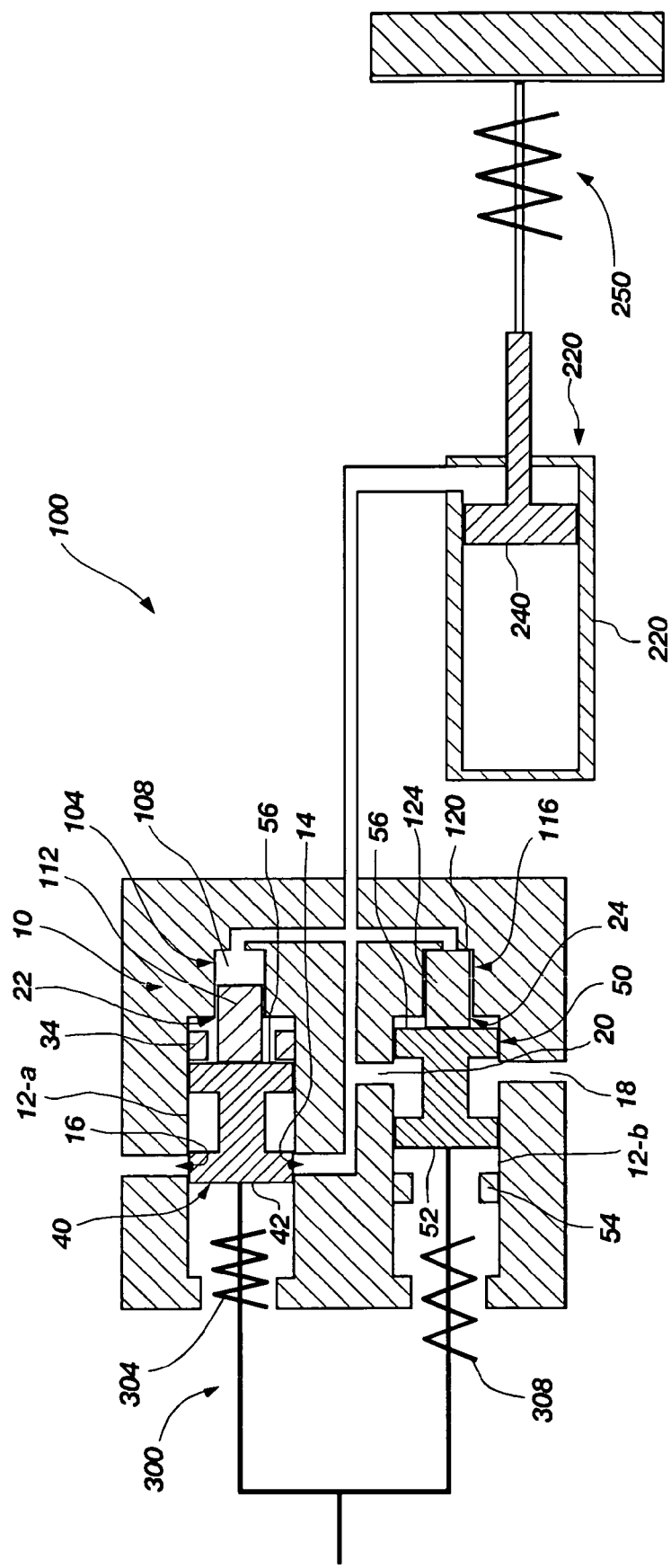
FIG. 7 illustrates another exemplary embodiment of a pressure control valve having a mechanical pressure source configured to supply a pilot pressure to the return and pressure spools.

FIG. 7 illustrates another exemplary embodiment of a PVC 10 as contained within a hydraulic actuator system 100. In this embodiment, the PCV 10 comprises a non-linear configuration, wherein the valve body is divided into two portions, namely valve body 12-a and valve body 12-b. Other non-linear configurations are contemplated herein, although not specifically discussed. In this embodiment, valve body portion 12-a has supported therein the return spool 40, and also has formed therein the return inlet and outlet ports 14 and 16, as well as feedback port 22 that fluidly connects a cylinder 108 of the mechanical feedback actuator 104. Valve body portion 12-b has supported therein the pressure spool 50, and also has formed therein the pressure inlet and outlet ports 18 and 20, as well as feedback port 24 that fluidly connects the cylinder 120 of the mechanical feedback actuator 116.

One of the unique features of this embodiment is the presence of a mechanical pilot system 300 that uses mechanical energy to supply a pilot force to the pilot pressure sides 42 and 52 of the return and pressure spools 40 and 50, respectively. Mechanical pilot system 300 applies a pilot force to the return and pressure spools 40 and 50 that opposes the feedback force applied to opposing sides of the return and pressure spools 40 and 50 by the mechanical feedback actuators 104 and 116. As such, the intrinsic feedback system, as well as the pilot pressure system are both mechanical systems that use a mechanically applied force rather than fluid pressure to displace the spools and to regulate pressure in the overall system.

As shown, mechanical pilot system 300 comprises a biasing member 304 that interacts with and applies a pilot force to the pilot pressure side 42 of the return spool 40. Likewise, the mechanical pilot system 300 comprises a similar biasing member 308 that interacts with and applies a pilot force to the pilot pressure side 52 of the pressure spool 50. Both biasing members 304 and 308 preferably comprise the same stiffness ratio so as to supply equivalent forces to each of the return and pressure spools 40 and 50. Any type of force application system or device known in the art can be used to actuate the mechanical pilot pressure system 300 to supply the pilot force to the return and pressure spools 40 and 50 and is therefore not discussed in detail herein.

In operation, if a pilot force is needed to overcome a given load pressure or feedback force acting on the feedback sides 46 and 56 of return and pressure spools 40 and 50 by the mechanical actuators 104 and 116, the mechanical pilot system 300 is actuated to apply the needed force. In this state, the pressure spool 50 is caused to displace, thus opening the pressure inlet and outlet ports 18 and 20 allowing the PCV 10 to function as discussed above. Due to the presence of spool stop 34, the return spool 40 does not displace, but instead remains in a closed position. The mechanical pilot system 300 is able to displace the pressure spool 50 while at the same time the return spool 40 is pushed against the spool stop 34 as a result of the biasing member 304 that partially compresses, thus allowing the mechanical pilot system 300 to displace enough to open the pressure inlet and outlet ports 18 and 20.

On the other hand, if a pilot force is needed to be less than a given load pressure or feedback force, the mechanical pilot system 300 is actuated accordingly. In this state, the mechanical pilot system 300 is actuated to allow the return spool 40 to displace, thus opening return inlet and outlet ports 14 and 16. In some cases, the mechanical pilot system 300 can be inactivated altogether, wherein the pressure spool 50 remains closed due to its contact with spool stop 54. Essentially, the system illustrated in FIG. 7 works on the same principles as those discussed above, except with the use of a mechanical pilot source rather than a fluid pilot pressure source.

Figure 8:
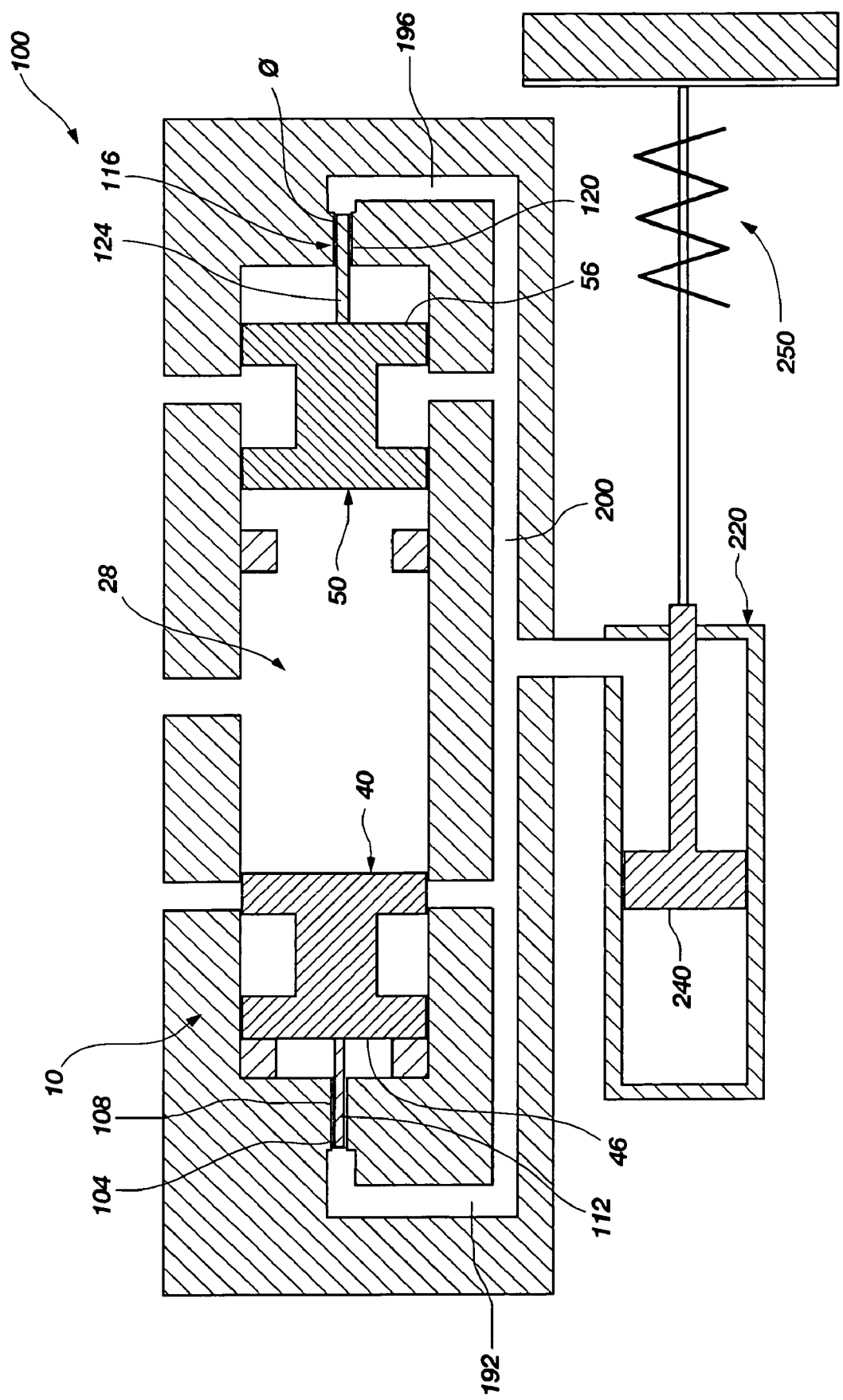
FIG. 8 illustrates another exemplary embodiment of a pressure control valve showing the intrinsic mechanical feedback system comprising actuators having components with reduced diameters as compared to those shown in FIGS. 1-7, thus providing different force or pressure multiplication in the system.

FIG. 8 illustrates still another exemplary embodiment of a PCV 10 as contained within a hydraulic actuator system 100. This particular embodiment illustrates the mechanical feedback actuators 104 and 116 having a different size than those illustrated in FIGS. 1-7. Specifically, the cylinders 108 and 120 and the feedback pistons 112 and 124 contained therein comprise smaller sizes or smaller diameters. Although the mechanical feedback actuators 104 and 116 have a smaller size than those shown in FIGS. 1-7, this is not intended to be limiting. Indeed, one skilled in the art will recognize that the mechanical feedback actuators may comprise any size to achieve different operating parameters.

As is well known in the art, the size of a hydraulic actuator in relation to another fluidly connected hydraulic actuator directly relates to and affects the hydraulic multiplication between these two devices, as well as allows for load/displacement ratios to vary significantly. In other words, the input and output forces, as well as the displacement distance of the respective load actuator and feedback pistons is affected and manipulated based on the respective sizes of the communicating actuators. The hydraulic actuator system 100 shown in FIG. 1 comprises a PCV 10 with mechanical feedback actuators 104 and 116 having a smaller size (e.g., cross-sectional area) than that of the hydraulic actuator 220 coupled to the load 250. Therefore, any given displacement of the actuator piston 240 within the hydraulic actuator 220 will result in a given fluid load pressure output (which may be above or below the pilot pressure) that will propagate through the main line 200, through first and second feedback lines 192 and 196, and into the cylinders 108 and 120 of the mechanical feedback actuators 104 and 116. This load pressure will cause the feedback pistons 112 and 124 to displace a given distance in accordance with commonly known principles of hydraulics and in accordance with whatever the pilot pressure is in the pilot chamber 28. The displacement of the feedback pistons 112 and 124 also functions to convert the induced load pressure into a force to be applied to the feedback sides 46 and 56 of the return and pressure spools 40 and 50. The resulting amount of force that is applied is also in accordance with commonly known principles of hydraulics.

The load pressure converted into a feedback force by the mechanical feedback actuators 104 sand 116 may result in a feedback force that is greater or less than the pilot pressure acting within pilot pressure chamber 28. Depending upon the pressure differential created, and particularly the direction of the pressure differential (e.g., which is the dominant pressure/force) will dictate the operation of the PCV 10. For example, if the pressure in the pressure chamber 28 is greater than the feedback force, the return and pressure spools 40 and 50 will displace to exert a force on the feedback pistons 112 and 124. This force will be converted into a fluid pressure that will propagate towards and act upon the hydraulic load actuator 220, and will also function to displace the pressure spool 50 and open the pressure inlet and outlet ports 18 and 20. Conversely, if the pilot pressure in the pilot chamber 28 is less than the feedback force as converted from the load pressure by the mechanical feedback actuators 104 and 116, the feedback force will function to displace the return and pressure spools 40 and 50 towards each other, thereby opening the return inlet and outlet ports 14 and 16. In any event, the mechanical feedback actuators 104 and 116 function to convert the load pressure into a feedback force and vice versa to operate the PCV 10 and to regulate pressure within the system, taking into account all hydraulic multiplications.

Based on the foregoing, FIG. 8 illustrates and the present invention contemplates use of hydraulic multiplication principles, namely area reduction and force multiplication, between the load hydraulic actuators and the feedback actuators to achieve the desired pressure regulation within the system and to control the dynamics of the PCV 10.

The present invention PCV provides several advantages over prior related valves. First, the system focuses on the control and regulation of pressure instead of on the control and regulation of flow. Indeed, flow control is a secondary consideration of the present invention. Second, because the feedback system is intrinsic, the PCV is capable of allowing operation at significantly higher bandwidths without going unstable. Third, energy efficiency is greatly improved as a result of the PCV to enter a slosh mode. Fourth, the system is able to exhibit improved dynamic behavior due to its high control of loop torque. In other words, because of the configuration of the PCV, the system is able to achieve significantly improved high torque loop gain with stability. Fifth, the PCV allows the system to achieve high torque loop gain, while simultaneously providing for the ability to dangle. This is an improved or enhanced passive motion capability. Sixth, the PCV is able to operate at select times without using or diluting the primary pressurized fluid reserve. In other words, the PCV preserves the main pressure source by not disturbing that, but instead, dealing with the flow of fluids independent of this source. Seventh, the PCV provides the ability of the system to absorb high loads at high bandwidths, while remaining stable. Eighth, the PCV's mechanical feedback system provides for efficient and economical pressure regulation of systems having significant load/displacement ratios between the load and the PCV. Thus, the PCV may regulate the pressure in a system having a large load as easily as a system having a small load by altering the respective sizes of the feedback actuators and the load actuators. Other advantages not specifically recited herein will be apparent to one skilled in the art. As such, those that are specifically recited herein should not be construed as limiting in any way.

In light of the foregoing, the present invention dual independent spool pressure control valve with its intrinsic feedback system and dynamic pressure regulation capabilities solves many of the problems found in classical or conventional servo systems.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

More specifically, while illustrative exemplary embodiments of the invention have been described herein, the present invention is not limited to these embodiments, but includes any and all embodiments having modifications, omissions, combinations (e.g., of aspects across various embodiments), adaptations and/or alterations as would be appreciated by those in the art based on the foregoing detailed description. The limitations in the claims are to be interpreted broadly based the language employed in the claims and not limited to examples described in the foregoing detailed description or during the prosecution of the application, which examples are to be construed as non-exclusive. For example, in the present disclosure, the term "preferably" is non-exclusive where it is intended to mean "preferably, but not limited to." Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited, except in the specification. Accordingly, the scope of the invention should be determined solely by the appended claims and their legal equivalents, rather than by the descriptions and examples given above.

What is claimed and desired to be secured by Letters Patent is:

1. A pressure control valve for regulating pressure within a servo system, said pressure control valve comprising:
    a valve body having return and pressure inlet and outlet ports formed therein, as well as first and second feedback ports, for fluidly communicating with an interior cavity of said valve body;
    a return spool freely supported within said valve body and configured to regulate fluid flow through said return inlet and outlet ports;
    a pressure spool, independent of said return spool, and freely supported within said valve body opposite said return spool, said pressure spool configured to regulate fluid flow through said pressure inlet and outlet ports;
    an intrinsic mechanical feedback system configured to displace said return and pressure spools in response to a pressure differential created between a pilot pressure and a feedback force concurrently acting on said return and pressure spools, respectively, said intrinsic mechanical feedback system functioning to dissipate said pressure differential in an attempt to equalize said pilot pressure and said feedback force; and
    limiting means located within said valve body configured to establish limiting positions of said return and pressure spools within said valve body during operation.

2. The pressure control valve of claim 1, wherein said intrinsic mechanical feedback system comprises:
    a first mechanical feedback actuator coupled to said valve body and having a feedback piston contained within a hydraulic cylinder in fluid communication with said first feedback port, said feedback piston configured to apply said feedback force acting on said return spool and to convert a feedback force to a load pressure within a hydraulic load actuator and a load pressure within said hydraulic load actuator to a feedback force;
    a second mechanical feedback actuator coupled to said valve body and having a feedback piston contained within a hydraulic cylinder in fluid communication with said second feedback port, said feedback piston configured to apply said feedback force acting on said pressure spool and to convert a feedback force to a load pressure within a hydraulic load actuator and a load pressure within said hydraulic load actuator to a feedback force.

3. The pressure control valve of claim 2, wherein said first mechanical feedback actuator comprises a pre-determined size and cross-sectional area.

4. The pressure control valve of claim 2, wherein said second mechanical feedback actuator comprises a pre-determined size and cross-sectional area.

5. The pressure control valve of claim 2, wherein said first and second mechanical feedback actuators are equivalent in size.

6. The pressure control valve of claim 2, wherein said first and second mechanical feedback actuators comprise a different size than said hydraulic load actuator fluidly connected thereto, thus achieving a pre-determined degree of hydraulic multiplication for accommodating a pre-determined load/displacement ratio.

7. The pressure control valve of claim 6, wherein said hydraulic multiplication may vary in degree depending upon the respective sizes of said mechanical feedback actuators as compared to said hydraulic load actuators.

8. The pressure control valve of claim 2, wherein said return and pressure spools each comprise a pilot pressure side and a feedback side, wherein said pilot pressure sides fluidly communicate with and are configured to receive said pilot pressure and said feedback sides communicate with and are configured to receive said feedback force as applied by said feedback piston.

9. The pressure control valve of claim 6, wherein said feedback sides of said return and pressure spools are in communication with said feedback pistons of said first and second mechanical feedback actuators, respectively, which are in fluid communication with said feedback ports formed within said valve body.

10. The pressure control valve of claim 2, further comprising first and second feedback lines in fluid communication with said first and second mechanical feedback actuators, respectively.

11. The pressure control valve of claim 10, further comprising a main fluid line in fluid communication with said return inlet port and said pressure outlet port, as well as said first and second feedback lines, said main fluid line configured to fluidly connect a hydraulic load actuator to said pressure control valve through a load feed line.

12. The pressure control valve of claim 1, further comprising a pressure purging mode defined by a pressure differential condition in said pressure control valve where said pilot pressure is less than said feedback force, thus causing said return spool to displace and open said return inlet and outlet ports to dissipate said pressure differential.

13. The pressure control valve of claim 1, further comprising an actuating mode defined by a pressure differential condition in said pressure control valve where said pilot pressure exceeds the feedback force, thus causing said pressure spool to displace and open said pressure inlet and outlet ports to allow pressurized fluid from a pressurized fluid source to enter to dissipate said pressure differential and to drive a load.

14. The pressure control valve of claim 1, further comprising a slosh mode defined by a pressure differential condition in said pressure control valve where said pilot pressure is maintained below said feedback force, thus causing said return spool to displace and open said return inlet and outlet ports to allow fluid to shunt back and forth in a low energy state.

15. A pressure control valve comprising:
a floating return spool configured to freely move within a valve body; and
a floating pressure spool configured to freely move within said valve body, said floating return and pressure spools being structurally independent of one another, said pressure control valve configured to regulate pressure via an intrinsic mechanical feedback system configured to utilize hydraulic multiplication to intrinsically and systematically displace at least one of said return and pressure spools in response to a pressure differential existing between a pilot pressure and a feedback force acting on opposing sides of each of said return and pressure spools, in an attempt to dissipate said pressure differential and equalize said pilot pressure and said feedback force.

16. The pressure control valve of claim 15, wherein said intrinsic mechanical feedback system comprises:
a first mechanical feedback actuator coupled to said valve body and having a feedback piston contained within a hydraulic cylinder in fluid communication with said first feedback port, said feedback piston configured to apply said feedback force acting on said return spool and to convert a feedback force to a load pressure within a hydraulic load actuator and a load pressure within said hydraulic load actuator to a feedback force; and
a second mechanical feedback actuator coupled to said valve body and having a feedback piston contained within a hydraulic cylinder in fluid communication with said second feedback port, said feedback piston configured to apply said feedback force acting on said pressure spool and to convert a feedback force to a load pressure within a hydraulic load actuator and a load pressure within said hydraulic load actuator to a feedback force.

17. A method for regulating and controlling pressure within a servo-type system, said method comprising:
providing a pressure control valve having a valve body and independent return and pressure spools freely situated in said valve body, said return and pressure spools each comprising a pilot pressure side and a feedback side and each configured to regulate fluid flow through return and pressure inlet and outlet ports formed in said valve body, respectively, in accordance with an intrinsic mechanical feedback system;
supplying a pilot pressure to said respective pilot pressure sides of said return and pressure spools;
supplying a feedback force to said respective feedback sides of said return and pressure spools, said feedback force corresponding to a load pressure, provided by a load actuator, that is converted by first and second mechanical feedback actuators positioned adjacent said return and pressure spools, respectively; and
inducing a pressure differential across said pilot pressure and feedback sides of said return and pressure spools, thus causing at least one of said return and pressure spools to displace in response to said pressure differential in an attempt to dissipate said pressure differential and equalize said pilot pressure and said feedback pressure.

18. The method of claim 17, further comprising providing a hydraulic load actuator to generate said load pressure, said hydraulic load actuator comprising a pre-determined size and cross-sectional area.

19. The method of claim 18, further comprising utilizing said mechanical feedback actuators, wherein each have a pre-determined size and cross-sectional area different from said hydraulic load actuator, to achieve a pre-determined degree of hydraulic multiplication for accommodating a pre-determined load/displacement ratio.

20. A method for introducing passive actuation within a servo or servo-type system comprising:
providing a load actuator coupled to a load and configured to convert back and forth a load pressure and a force;
providing a pressure control valve in fluid communication with said load actuator, said pressure control valve having a valve body and independent return and pressure spools freely situated in said valve body, said return and pressure spools each comprising a pilot pressure side and a feedback side and each configured to regulate fluid flow through return and pressure inlet and outlet ports formed in said valve body, respectively, in accordance with an intrinsic mechanical feedback system;
supplying a pilot pressure to said respective pilot pressure sides of said return and pressure spools;
supplying a feedback force to said respective feedback sides of said return and pressure spools, said feedback force corresponding to a load pressure, provided by said load actuator, that is converted by first and second mechanical feedback actuators positioned adjacent said return and pressure spools, respectively; and
manipulating said pilot pressure to be below said feedback force to cause said pressure control valve to enter a passive actuation or slosh mode, wherein said pressure spool is closed and said return spool is open, thus allowing fluid to directly shunt back and forth between said pressure control valve and said load actuator through said return inlet and outlet ports.

21. The method of claim 20, further comprising maintaining said pilot pressure to be below said feedback force for a pre-determined period of time to maintain said pressure control valve in said slosh mode.

22. The method of claim 20, further comprising increasing the gain of the pressure control valve to achieve a soft, dynamic performance capability.

* * * * *